United States Patent
Giuseppin et al.

(10) Patent No.: US 11,477,997 B2
(45) Date of Patent: Oct. 25, 2022

(54) FREEZE CONCENTRATION OF ROOT- OR TUBER JUICE

(71) Applicant: Coöperatie AVEBE U.A., Veendam (NL)

(72) Inventors: Marco Luigi Federico Giuseppin, Veendam (NL); Stefano Iannacone, Groningen (NL); Wybren Koopmans, Veendam (NL); Robin Eric Jacobus Spelbrink, Veendam (NL); Jacqueline Alida Maria Berghout, Veendam (NL)

(73) Assignee: Coöperatie AVEBE U.A., Veendam (NL)

( * ) Notice: Subject to any disclaimer, the term of this patent is extended or adjusted under 35 U.S.C. 154(b) by 64 days.

(21) Appl. No.: 16/078,505

(22) PCT Filed: Feb. 22, 2017

(86) PCT No.: PCT/NL2017/050104
§ 371 (c)(1),
(2) Date: Aug. 21, 2018

(87) PCT Pub. No.: WO2017/146568
PCT Pub. Date: Aug. 31, 2017

(65) Prior Publication Data
US 2019/0082715 A1    Mar. 21, 2019

(30) Foreign Application Priority Data
Feb. 22, 2016  (EP) .................................... 16156769

(51) Int. Cl.
*A23J 3/14*    (2006.01)
*A23J 1/16*    (2006.01)
(Continued)

(52) U.S. Cl.
CPC . *A23J 3/14* (2013.01); *A23J 1/16* (2013.01); *A23L 2/087* (2013.01); *A23L 2/12* (2013.01);
(Continued)

(58) Field of Classification Search
CPC ..... A23J 3/14; A23J 1/16; A23L 2/087; A23L 2/12; A23L 19/10; A23L 27/22;
(Continued)

(56) References Cited

U.S. PATENT DOCUMENTS 4,491,600 A    1/1985  Gobel et al.
5,489,340 A *  2/1996  Stute ....................... C08B 30/12
                                                          127/67
(Continued)

FOREIGN PATENT DOCUMENTS

DE  2551342 A1  5/1977
EP  1920662 A1  5/2008
(Continued)

OTHER PUBLICATIONS

World Environment Day: 10% Less Carbon and Less Water Consumption Thanks to Ducam, Avebe, date Jun. 5, 2020. https://www.avebe.com/news/avebe-world-environment-day-10-less-carbon-and-less-water-consumption-thanks-to-ducam/.
(Continued)

*Primary Examiner* — Katherine D Leblanc
(74) *Attorney, Agent, or Firm* — Hoffmann & Baron, LLP

(57) ABSTRACT

The invention provides a method for treating root- or tuber juice, comprising
   a) a pretreatment of the root- or tuber juice to remove root- or tuber lipids to a level below 28 g/kg dry weight;
   b) cooling the root- or tuber juice to a temperature of −0.3° C. to −16° C. to form ice crystals; and
   c) separating the ice crystals from the root- or tuber juice to obtain, as a first root- or tuber juice product, a
(Continued)

concentrated root- or tuber juice. In addition, the invention provides methods to obtain protein depleted root- or tuber juice products, as well as products comprising root- or tuber free amino acids, and uses thereof.

15 Claims, 5 Drawing Sheets

(51) Int. Cl.
 *A23L 27/22* (2016.01)
 *A23L 27/00* (2016.01)
 *A23L 19/10* (2016.01)
 *A23L 2/08* (2006.01)
 *A23L 2/12* (2006.01)
 *A23L 33/175* (2016.01)

(52) U.S. Cl.
 CPC .............. *A23L 19/10* (2016.08); *A23L 27/22* (2016.08); *A23L 27/88* (2016.08); *A23L 33/175* (2016.08); *A23V 2002/00* (2013.01); *A23V 2200/16* (2013.01); *A23V 2250/038* (2013.01); *A23V 2250/061* (2013.01); *A23V 2250/0608* (2013.01); *A23V 2250/548* (2013.01); *A23V 2300/20* (2013.01); *A23V 2300/34* (2013.01)

(58) Field of Classification Search
 CPC .......... A23V 2200/16; A23V 2250/038; A23V 2250/0608; A23V 2250/061; A23V 2250/548; A23V 2300/02
 See application file for complete search history.

(56) References Cited

U.S. PATENT DOCUMENTS

| | | | |
|---|---|---|---|
| 8,465,911 B2* | 6/2013 | Giuseppin | A23L 2/66 435/4 |
| 2004/0060322 A1* | 4/2004 | Witkamp | B01D 9/0004 62/532 |
| 2010/0087628 A1 | 4/2010 | Lihme et al. | |

FOREIGN PATENT DOCUMENTS

| | | | |
|---|---|---|---|
| JP | 56-89802 | | 7/1981 |
| JP | 4-36158 | | 2/1992 |
| NL | 7612684 A | | 5/1977 |
| WO | 9742834 A1 | | 11/1997 |
| WO | WO97/47559 | * | 12/1997 |
| WO | 2015000606 A1 | | 1/2015 |

OTHER PUBLICATIONS

"Proteins, Denaturing And How Essential Water Is To Basic Life", Science 2.0 News Staff | Apr. 16, 2012 02:02 AM. https://www.science20.com/news_articles/proteins_denaturing_and_how_essential_water_basic_life-88943.
Spelbrink—Statement on potato protein in concentrated potato juice ("aardappeldiksap") in Witkamp.
Protamylasse AVB (agroBioSource).
Elbahloul et al.—Applied and Environmental Microbiology, Dec. 2005, Protamylasse, a Residual Compound of Industrial Starch Production, Provides a Suitable Medium for Large-Scale Cyanophycin Production, pp. 7759-7767.
Grommers et al.—11 Potato Starch: Production, Modifications and Uses.

* cited by examiner

FREEZE CONCENTRATION OF ROOT- OR TUBER JUICE

This application is the U.S. National Phase of, and Applicant claims priority from, International Patent Application Number PCT/NL2017/050104 filed 22 Feb. 2017, which claims priority from EP 16156769.8 filed 22 Feb. 2016, each of which is incorporated herein by reference.

The invention is in the field of treating root- or tuber juice, in particular potato juice. Root- or tuber juice is an aqueous liquid derived from root- or tubers, which can for instance be obtained as a byproduct after starch isolation from potato tubers, or from a side stream derived from the cutting and processing of consumption potatoes in the preparation of e.g. French fries. Root- or tuber juice is rich in various functional peptides as well as other components. Also, it is available at a large scale due to the scale at which root- or tubers, most notably potatoes, are processed. This makes root- or tuber juice a potentially interesting source of various components.

However, a drawback of root- or tuber juice is that it is inherently unstable. Raw root- or tuber juice contains a large quantity of native enzymes, many of which having interesting properties. However, some of these enzymes are proteolytic, so that these degrade other proteins and peptides in root- or tuber juice. Therefore, raw root- or tuber juice loses its native character within the hour. Inactivation of these enzymes such as by heat or acid treatment is no option, because this would denature the enzymes, and destroy the interesting functional components and desirable properties associated with the native state.

In addition, root- or tuber juice tends to oxidize easily. Raw root- or tuber juice contains many phenolic acids, polyunsaturated fatty acids, as well as lipoic acid and sulfoamino acids, which under the influence of oxygen from air and/or enzymes degrade to various toxic and/or colored species. Oxidation also leads to conversion of phenolic compounds into quinones which rapidly combine into a dark polymer residue. During the oxidation process reaction the proteins can partially cross-link, which dramatically reduces the solubility and native state of the proteins.

Also, the taste of root- or tuber juice is negatively affected by such processes.

These degradative processes preclude the use of even lightly degraded root- or tuber juice for the isolation of food-grade components, unless expensive purification techniques are also applied.

In addition, root- or tuber juice is subject to formation of Maillard products. Maillard products are formed from free amines and reducing sugars at elevated temperature in a complex series of interlocking reactions that result in the darkening of the material and the development of volatile flavors. While in some foods the reaction is highly desired, uncontrolled Maillard reactions result in unpleasantly dark products with a "burned" scent. Drying processes in particular tend to result in Maillard products.

The hydrolysis- and oxidation reactions mentioned above are exacerbated by the presence of endogenous enzymes in root- or tuber juice, in particular patatin, polyphenol oxidase and lipoxygenase. Moreover, proteolysis degrades protein into bitter peptides. Also, root- or tuber juice can contain high levels of undesired microorganisms that originate from infected tubers. Given time and opportunity, these organisms will spoil the juice. Desirable compounds such as 5'-nucleotides are dephosphorylated into nucleosides.

A known technique for removing water from aqueous dispersions or solutions comprising unstable compounds is freeze concentration. Freeze concentration of potato thick juice to isolate a crystalline material, in particular potassium nitrate or potassium phosphate, has been mentioned in WO 01/28958, but the procedure mentioned there does not result in acceptable results when using fresh potato juice because it leads to denaturation of the potato protein, which is undesirable in the present context (potato thick juice is a heat-coagulated potato juice, from which the coagulated (denatured) protein has been removed and which is subsequently concentrated).

Furthermore, root- or tuber juice generally comprises a variety of compounds which interfere with ice formation and growth. Presence of such compounds also tends to interfere with filtration, as filters are readily clogged.

SUMMARY OF THE INVENTION

The invention provides a method for treating root- or tuber juice, comprising
a) a pretreatment of the root- or tuber juice to remove root- or tuber lipids to a level below 28 g/kg dry weight;
b) cooling the root- or tuber juice to a temperature of −0.3° C. to −16° C. to form ice crystals; and
c) separating the ice crystals from the root- or tuber juice to obtain, as a first root- or tuber juice product, a concentrated root- or tuber juice. In addition, the invention provides methods to obtain protein depleted root- or tuber juice products, as well as products comprising root- or tuber free amino acids, and uses thereof.

DETAILED DESCRIPTION

Figure 1:
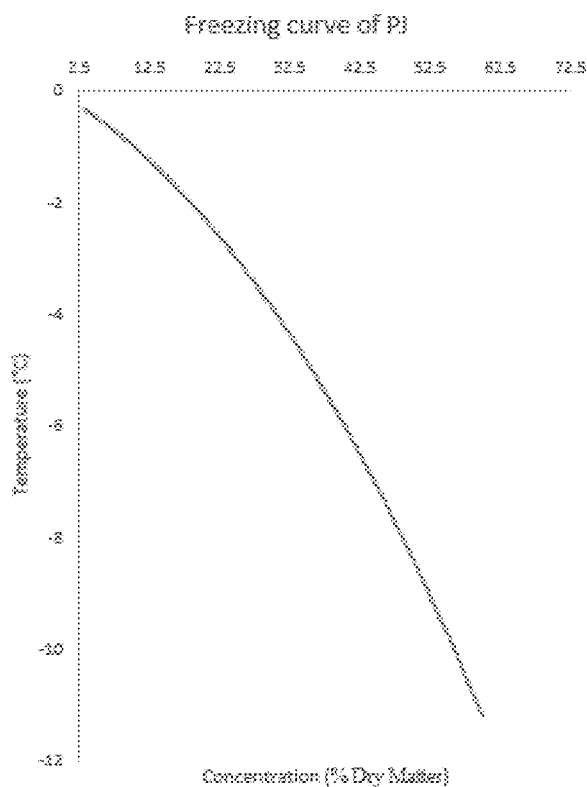
FIG. 1: dependency of the freezing point of potato juice on the content of soluble solids.
Figure 2:
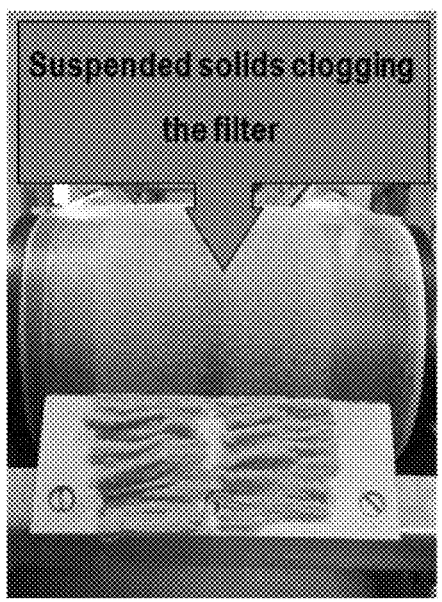
FIG. 2: view of the exit of the belt filter. Non-pretreated potato juice processed with freeze concentration results in clogging of the filter cloth.
Figure 3:
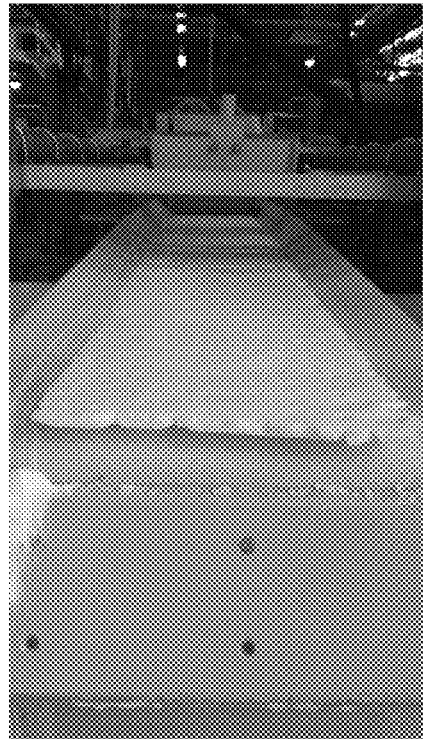
FIG. 3: view of the exit of the belt filter. Filtered and washed ice cake as obtained from freeze concentration after a lipid removal pretreatment.
Figure 4:
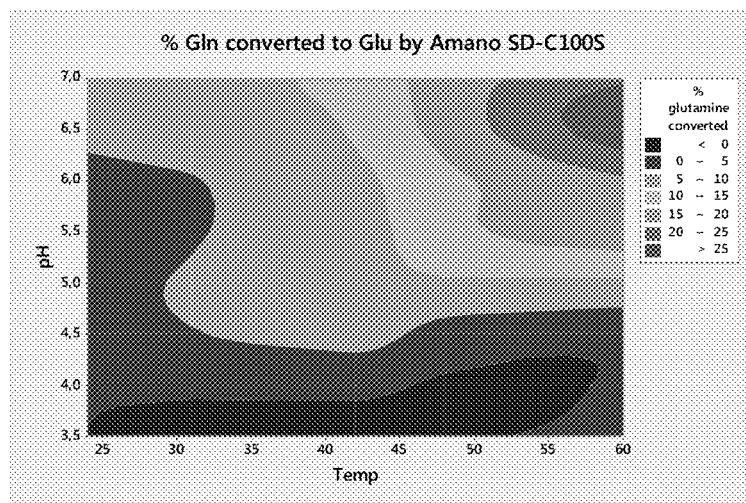
FIG. 4: conversion of gln to glu by Amano SD-C100S (Amano, JP)
Figure 5:
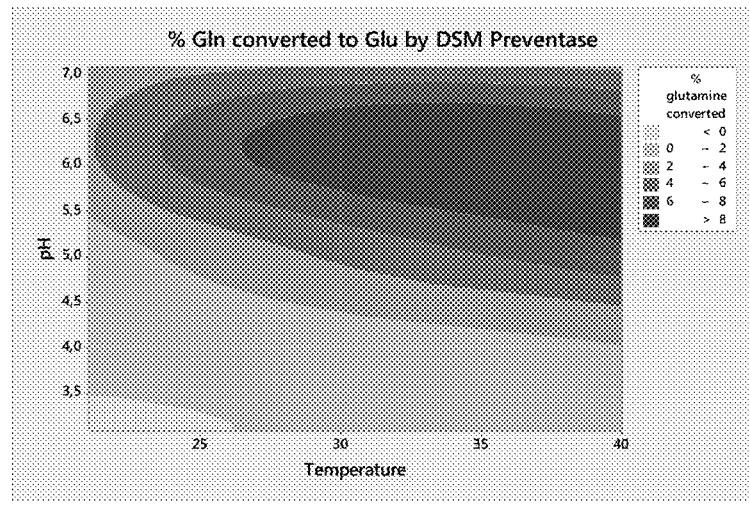
FIG. 5: conversion of gln to glu by PreventAse (DSM)

The invention provides a method for treating root- or tuber juice, comprising
a) a pretreatment of the root- or tuber juice to remove root- or tuber lipids to a level below 28 g/kg dry weight;
b) cooling the root- or tuber juice to a temperature of −0.3° C. to −16° C. to form ice crystals; and c) separating the ice crystals from the root- or tuber juice to obtain, as a first root- or tuber juice product, a concentrated root- or tuber juice.

Root- or tuber juice, in the present context, is juice from roots or tubers, and may in the following also be referred to as "juice". Roots and tubers include the species of potato (*Solanum tuberosum* or Irish potato, a seasonal crop grown in temperate zones all over the world); sweet potato (*Ipomoea batatas*, a seasonal crop grown in tropical and subtropical regions, used mainly for human food); cassava (including *Manihot esculenta*, syn. *M. utilissima*, also called manioc, mandioca or yuca, and also including *M. palmata*, syn. *M. dulcis*, also called yuca dulce, which are semi-permanent crops grown in tropical and subtropical regions); yam (*Dioscorea* spp), widely grown throughout the tropics as a starchy staple foodstuff); yautia (a group including several plants grown mainly in the Caribbean, some with edible tubers and others with edible stems, including *Xanthosoma* spp., also called malanga, new cocoyam, ocumo, and also including tannia (*X. sagittifolium*)); taro (*Colocasia esculenta*, a group of aroids cultivated for their edible starchy corms or underground stems, grown throughout the tropics for food, also called dasheen, eddoe, taro or old cocoyam); arracacha (*Arracacoa xanthorrhiza*); arrowroot (*Maranta arundinacea*); chufa (*Cyperus esculentus*); sago palm (*Metroxylon* spp.); oca and ullucu (*Oxalis tuberosa* and *Ullucus tuberosus*); yam bean and jicama (*Pachyrxhizus erosus* and *P. angulatus*); mashua (*Tropaeolum tuberosum*); Jerusalem artichoke (topinambur, *Helianthus tuberosus*).

Preferably, the root or tuber is a potato, sweet potato, cassava or yam, and more preferably the root or tuber is a potato (*Solanum tuberosum*).

Root- or tuber juice, in the present context, is an aqueous liquid derived from root- or tubers by for instance pressing, grinding and filtering, pulsed electric field treatment, as the runoff from water jets for the production of processed root- or tuber products like chips and fries or by other means known in the art. Settling insoluble solids are essentially absent in root- or tuber juice, but a juice as obtained usually comprises suspended solids or soluble precursors that naturally form solids by degradation in time, which do not or barely settle by gravity, and which are responsible for the juice's turbidity. The total suspended solids (TSS) indicates all solid material present in dispersed form in root- or tuber juice. This solid material is small enough to not phase separate from the solution by sinking to the bottom, but is also not molecularly dissolved. In short, TSS is the total of non-dissolved but dispersed solids in root- or tuber juice.

Root- or tuber juice in the present context is raw root- or tuber juice, i.e. root- or tuber juice in which the components are present in their natural state. This can be judged by analyzing whether the proteins are in their native state, which can be tested by (re-)solubility tests or dynamic calorimetry scanning (Walstra, P. (2003). Proteins. In Physical Chemistry of Foods (pp. 221-267). New York: Marcel Dekker Inc.). In addition, root- or tuber juice in the present context is preferably essentially without color. This can be seen by analyzing the total color of the root- or tuber juice.

Total color is determined as the sum of the absorbance at 420, 520 and 620 nm on a solution of 4.5 wt. % solids. For juices which have a different solid content, the solution can for instance be diluted to 4.5 wt. % to determine the total color directly, or the total color may be obtained mathematically by adjusting for the solids content, for example in case the solid content of the juice is lower than 4.5 wt. %.

A juice in the present context may be used as obtained. However, root- or tuber juice in the present context may have undergone certain treatments which do not or barely affect the raw, natural state of the juice components.

Thus, root- or tuber juice may optionally be diluted or concentrated prior to the present method. Dilution may be achieved by addition of a non protein-denaturing solvent (preferably water), which comprises less protein and/or salts than the root- or tuber juice which is to be diluted. Most preferably, the non-protein denaturing solvent is regular water, which may have a pH between 4 and 8. Suitable acids and/or salts to reach this pH are defined elsewhere.

Concentration of root- or tuber juice may be achieved by conventional methods. Suitable methods include evaporation, membrane concentration (also called "reverse osmosis"), as well as alternative membrane based separation such as membrane distillation (MD) and pervaporation (PER).

Evaporation generally uses gas-liquid phase separation, and is relatively inexpensive. The skilled person is well-aware of methods which result in concentration of juices using evaporation.

Using evaporation, it is possible to attain any dry matter content, up to approximately 100 wt. %, but also solutions with a high dry matter content, such as up to 50 wt. %, may be obtained by evaporation. However, evaporation bears a risk of denaturing protein, and is usually relatively slow. In order to retain the native structure of protein, evaporation must be done at relatively low temperatures, such as at about room temperature, but even then the slow rate at which evaporation occurs leads to a lower quality product.

Therefore, evaporation is preferably used in conjunction with techniques which result in denatured isolated protein, such as heat coagulation, although it may be used in conjunction with techniques used for the isolation of native protein (see below).

Reverse osmosis (RO) is based on the molecular-sieve mechanism of semi-permeable membranes which retain solids and dissolved compounds, as well as the concentrated juice (the retentate) but allow water to pass (the permeate). Using reverse osmosis, an upper limit to the dry matter content exists of approximately 25 wt. %, caused by the osmotic pressure of the source juice.

Reverse osmosis can be performed in two ways: in continuous mode, multiple membrane separation units are required which increase the concentration step-wise. In batch-mode, the retentate is recirculated back to the RO-unit, until the desired concentration has been reached. The skilled person is well-aware of how to configure a reverse osmosis unit for a certain juice to attain a certain desired concentration.

Also, root- or tuber juice which has undergone other treatments which leave the juice's molecular components in their raw state (i.e. retaining natural functionality) are contemplated for use with the present invention. Examples of such treatments are starch removal, adjustment of the pH, addition or removal of salts, defoaming, removal of root- or tuber fibers, filtration or expanded bed chromatography.

Adjustment of the pH of root- or tuber juice may be achieved by any means known in the art, such as by addition of for instance strong acids such as HCl, $H_2SO_4$, $H_3PO_4$, by addition of weak acids such as acetic acid, citric acid, formic acid, lactic acid, gluconic acid, propionic acid, malic acid, succinic acid, adipic acid, tartaric acid, sodium bisulphite (formed by gaseous $SO_2$ or $NaHSO_3$), by addition of strong bases such as NaOH, KOH, or by addition of weak bases such as ammonia, soda, potash or a suitable conjugated base of the acids above. Also combinations of these acids and bases may be added, for example to attain a buffered root- or tuber juice.

In the context of the present invention, HCl is a preferred strong acid, adipic acid is a preferred weak acid (because it stops conversion from glutamate to GABA), and sodium or potassium hydroxide are preferred strong bases.

Another treatment is addition or removal of salts to or from root- or tuber juice. Salts may be added to stabilize raw root- or tuber juice, to control chemical- and enzymatic reactions, to adjust the conductivity or to adjust the solubility of different ionic species. Suitable salts include for instance salts from cations sodium, potassium, magnesium, calcium, and anions chloride, phosphate, sulphite and acetate. Preferably, salts to be added are sodium or potassium chloride, calcium phosphate, sodium or potassium sulphite and sodium acetate.

Salts may also be removed, by methods such as diafiltration, electrodialysis or capacitive deionization. Also, other compounds may be added, such as for instance inhibitor compounds to proteolytic enzymes. Such compounds are well-known in the art.

Another treatment is for instance starch removal, such as common to obtain starch granules industrially. Methods for starch removal are well-known. Root- or tuber juice in the present context is preferably a root- or tuber juice by-product from starch isolation. That is, root- or tuber juice in the present context preferably comprises at most 1.0 wt. % starch, more preferably 0.5 wt. %, most preferably 0.01 wt. % starch. Most preferably in the present context, root- or tuber juice has undergone starch removal and one or more of the treatments filtration, reverse osmosis, flocculation, sedimentation, standing wave ultrasound separation or centrifugation.

Preferably, the present method pertains to treating root- or tuber juice on an industrial scale, such as a root- or tuber juice quantity per process line of at least 0.01 m$^3$/h, preferably at least 0.1 m$^3$/h, more preferably at least 1 m$^3$/h, even more preferably at least 10 m$^3$/h.

It has been found that in order to be able to freeze concentrate raw root- or tuber juice in an acceptable and economic process, it is essential that root- or tuber lipids are removed from the root- or tuber juice prior to freeze concentration. Root- or tuber lipids should be removed to a level below 28 g/kg dry weight, preferably below 25, more preferably below 23, more preferably below 21, more preferably below 19, most preferably below 16 g/kg dry weight. Preferably, root- or tuber lipids to be removed are unsaturated lipids. The quantity of root- or tuber lipids in root- or tuber juice can be determined by the method of Matyash and coworkers (Matyash V., Liebisch G., Kurzchalia T. V., Shevchenko A., & Schwudke D. (2008), J Lipid Res. 49(5): 1137-46 "Lipid extraction by methyl-tert-butyl ether for high-throughput lipidomics").

It is essential that the pretreatment to remove root- or tuber lipids does not or barely affect the "raw" character of the juice, i.e. native state of the protein in the root- or tuber juice. The skilled person is aware of various methods to achieve root- or tuber lipid removal without affecting the native state of protein. These methods include for instance flocculation, sedimentation, flotation, centrifugation or micro-filtration.

Flocculation can be achieved by electroflocculation using Fe-electrodes or by addition of natural or synthetic polyionic compounds, preferably a combination of natural and/or synthetic poly-anionic and poly-cationic compounds. More preferably, flocculation is achieved by contacting a root- or tuber juice with a coagulant and a flocculant to form a floc material such as described in application PCT/NL2015/050605, wherein a) the coagulant comprises a cationic coagulant and the flocculant comprises an anionic polyacrylamide with a specific viscosity of 4-6 mPa·s and a charge density between 45 and 75%; or b) the coagulant comprises a polymeric silicate of formula $SiO_3^{2-}$ and the flocculant comprises a cationic polyacrylamide with a specific viscosity of 3-5 mPa·s and a charge density of at most 30%; or c) the coagulant comprises a cationic coagulant and the flocculant comprises carrageenan;

and wherein the floc material is subsequently isolated from the juice to obtain a clarified root- or tuber juice and a floc material.

A preferred method of flocculation is using a polyacrylamide such as Superfloc A150 of Kemira, in combination with a polytannine (such as Bio20 of Servyeco) and k-carrageenan (such as Gelcarin GP812 of FMC biopolymer).

An alternative preferred method of flocculation uses a carboxymethylcellulose such as Walocel CRT 60.000 PA 07 (Dow Chemicals), in combination with a polytannine such as BioSO3 (Servyeco) and a k-carrageenan such as Gelcarin GP812.

It is preferred that flocculation is performed at a temperature below 22° C., more preferably below 18° C. or lower, such as for instance at 15-18° C. At temperatures below 22° C., the rate of lipid degradation in root or tuber juice is substantially reduced, which ensures that isolated products comprise less lipid oxidation products.

At temperatures above 18° C., some part of the flocs derived from root or tuber juice shows a tendency to "float", which hinders separation. At temperatures of 18° C. or lower, this tendency does not exist.

The presence of lipids in general has the result of precluding freeze concentration to any practicable extent, so that removal of lipids to below a quantity of 28 g/kg dry weight is essential. However, lipid removal in the present context may be incomplete. For a high quality product however, it is preferred that at least the unsaturated lipids are as much as possible removed. Unsaturated lipids generally have a higher degradation rate than saturated lipids, so that removal of unsaturated lipids has a higher influence on the purity of the isolated products than removal of saturated lipids. Generally however, removal of lipids to below a quantity of 28 g/kg dry weight is sufficient to allow for isolation of a high quality product.

Sedimentation can be achieved by gravity and centrifugal forces and enhanced sedimentation using static ultrasound waves.

Flotation can be achieved by the addition of microbubbles or by ageing of root- or tuber juice. Flotation is preferably achieved by adding microbubbles.

Centrifugation can be achieved by for instance disk stack centrifuge or bowl centrifuge. Centrifugation is preferably achieved by a disk stack centrifuge.

Filtration can be achieved by for instance micro-, ultra- or nano-filtration or by a pre-coated rotary vacuum filter. Filtration is preferably achieved by a pre-coated rotary vacuum filter.

Among methods to achieve root- or tuber lipid removal, flocculation, sedimentation or centrifugation are preferred, most preferably flocculation and sedimentation.

It is preferred if the method of the invention also includes a treatment to remove total suspended solids (TSS) prior to cooling the root- or tuber juice to form ice crystals. The quantity of TSS can be determined by determining the absorbance of a juice with a dry matter content of 4.5 wt. % at 620 nm.

TSS should preferably be removed to a level below 3.2, preferably below 2.7, more preferably below 2.4, even more preferably below 2.1, yet more preferably below 1.7, even more preferably below 0.6, and most preferably below 0.2 expressed as absorbance at 620 nm.

TSS can be removed to these levels by high-capacity industrial disc stack separators, high-speed centrifugation or microfiltration.

Preferably, TSS can be removed by high speed centrifugation, or microfiltration.

A pretreatment which removes both root- or tuber lipids and TSS is much preferred. Such methods include instance flocculation, sedimentation, flotation, centrifugation or micro-filtration. One particularly preferred pretreatment also in this context is flocculation.

After removal of root- or tuber lipids and optionally TSS from the root- or tuber juice by one or more pretreatments as described, the root- or tuber juice is cooled to a temperature of −0.3° C. to −14° C. to form ice crystals. Preferably, the root- or tuber juice is cooled to a temperature of −1.5° C. to −12° C., more preferably to a temperature of −4° C. to −9° C., even more preferably to a temperature of −6° C. to −9° C.

The freezing point of a root- or tuber juice depends on the concentration and type of soluble solids. The freezing point values for root- or tuber juice at different concentrations of soluble solids are shown in FIG. 1, exemplified by potato juice. The maximum dry matter content (which is the quantity of soluble solids) which may be attained using freeze concentration is 60 wt. %, for juices which have a relatively low protein content. With juices with higher protein content, such as a starting juice for the present invention, a dry matter content of at least 30 wt. %, preferably at least 40 wt. % or more preferably at least 50 wt. % may be reached.

In an optional embodiment, root- or tuber juice is cooled to an eutectic point, to co-crystallize a crystalline component at its eutectic point with the ice crystals. The eutectic point is a characteristic point in the phase diagram of a salt-water mixture. At the eutectic point an equilibrium exists between ice, salt (or other crystallizable material) and a solution with a specific (constant) concentration. This specific concentration is called the eutectic concentration and the temperature at which this equilibrium is found is the eutectic temperature. The eutectic point of the crystalline compound depends on the concentration of the crystallizing solid(s) in the root- or tuber juice.

The eutectic point for a specific crystalline compound can be determined by observing the simultaneous crystallization of both ice and the other component. When a direct observation is not possible the eutectic point can be detected when there is no change in the final temperature of the system regardless to the amount of energy is put into the system for further cooling.

One compound which can co-crystallize with the ice-crystals is asparagine. For this, the root- or tuber juice must be cooled to a temperature of +5° C. to −10° C., preferably −2° C. to −8° C., more preferably −3° C. to −7° C., at a concentration of 15-30 g asparagine/L. Most preferably, the eutectic point of a root- or tuber juice containing about 30 g/L asparagine is about −4° C.

An asparagine product which may be obtained by this method generally is a powder, with a dry matter content of at least 90 wt. %, preferably at least 95 wt. %, more preferably at least 98 wt. %. The dry matter comprises at least 53 wt. %, preferably at least 86 wt. % of free amino acids. The amino acids comprise, as wt. % of free amino acids, at least 90 wt. % asparagine, preferably at least 95 wt. %.

Cooling the root- or tuber juice to obtain ice and optionally other crystals can be achieved by any means known in the art. Preferably, cooling is achieved through suspension crystallization, layer (film) crystallization or block crystallization.

In one embodiment, cooling is achieved through suspension crystallization, which comprises an initial phase of ice nuclei formation (nucleation), followed by a second phase which involves the growth of ice nuclei in the solution. This may suitably be performed in a scraped surface heat exchanger. In a scraped heat exchanger, the wall is cooled, so that ice crystals tend to stick to the cooled wall. Moving scrapers continuously remove those crystals preventing the ice to scale the heat exchanger.

In another embodiment, cooling is achieved through layer crystallization. This can be achieved by the crystallization of water present in the juice on a cold surface by flowing the juice past the surface, so that an ice layer forms and the juice is concentrated.

Block crystallization occurs when a liquid solution is completely frozen and the temperature in the center of the product is largely below the freezing point. After that, the whole frozen solution is thawed and the concentrated fraction is separated from the ice fraction by means of gravitational thawing assisted or by other techniques to enhance the separation efficiency Preferred methods of cooling are suspension crystallization and layer crystallization, most preferably suspension crystallization because it enables a fast growth rate of the ice crystals and is associated with a better heat transfer rate and therefore higher energy efficiency.

Cooling the root- or tuber juice is preferably achieved using a cooling rate as high as possible, such as at least 4° C./min, preferably at least 8° C./min, more preferably at least 12° C./min and even more preferably at least 15° C./min. Cooling to the indicated temperature is further preferably achieved within 2 to 10 minutes. Cooling is achieved preferably more or less linear with time, but cooling using various rates at different times is not to be excluded.

Optionally, after cooling the root- or tuber juice to a temperature defined above, the root- or tuber juice is kept at this temperature for some time to allow formed ice crystals to grow. During this time, the juice is never kept static, which can be achieved by for instance mixing. Preferably, the root- or tuber juice can be kept at the indicated temperature for 1 min. to 24 hrs. Preferably, the root- or tuber juice can be kept at the indicated temperature for 30 min. to 12 hrs, more preferably 1-6 hrs.

In addition, during cooling, the juice is preferably mixed, preferably by stirring, such as at 200-2000 rpm, preferably at 400-1500 rpm, more preferably at 700-1100 rpm. A stirring rate of below 1100 rpm, preferably below 1000 rpm, is preferred in order to minimize foaming.

This second step of the present process results in formation of ice crystals. The ice crystals are preferably substantially pure water, such as at least 70 wt. %, preferably at least 80 wt. %, more preferably at least 90 wt. %, most preferably at least 97 wt. % water. The ice crystals preferably have a size of 1 mm to 10 microns, more preferably 1 mm-500 microns, most preferably 900-200 microns. A micron, throughout, is equal to a micrometer. The size of an ice crystal, in this context, can be determined by determining the longest straight-line diameter of the ice crystal, such as for instance by microscopy inline laser probe measurement or visual inspection.

After forming the ice crystals, the ice crystals are separated from the root- or tuber juice to obtain, as a first root- or tuber juice product, a concentrated root- or tuber juice. Suitable methods to separate ice crystals from root- or tuber juice are well-known in the art, and include for instance filtration, hydraulic washing columns, and centrifugation.

Filtration is preferably achieved using filters of 10-500 microns, preferably 20-200 microns, more preferably 40-100 microns. Filtration may be achieved in a continuous or a batch process, but preferably, it is a continuous process.

In a further preferred embodiment, the filtration is assisted by vacuum, as is well-known in the art.

Alternatively, separation of ice crystals can be achieved by hydraulic washing. This may be achieved through the use of hydraulic washing columns.

In hydraulic washing, the concentrate is squeezed through a filter at the bottom of a wash column. In this way a packed bed of ice crystals is formed. The packed bed is subsequently pushed upwards. At the top of the wash column, the ice is scraped off and molten, and part of the melting water is used to wash the packed bed. In a variation of hydraulic washing, a piston is used to press the ice/water mixture through the bottom filter, in which case the technique is sometimes referred to as piston washing.

Further alternatively, separation of ice crystals can be achieved by centrifugation. This may be achieved through the use of a peeling centrifuge The fluid is pumped to a centrifuge filtration-clarification system where it is subjected to high g forces (up to 7500 times the force of gravity) the juice is separated into a heavy phase (mother liquor) and a light phase (ice). The liquid phase, thanks to the high centrifugal force generated, separates from the ice and it passes a filter situated on the wall of the centrifuge. Compressed ice cake is removed by a peeler which will convey the peeled ice into the ice discharge connections. Any residual solids are separated and removed manually from manual clean units or discharged automatically with an automatic self-cleaning style unit.

In case the cooling of root- or tuber juice was associated with co-crystallization of a crystallizable compound, for instance asparagine, this compound is separated from the root- or tuber juice with the ice crystals. It may be isolated by melting the ice and subsequently isolating the crystallizable compound by known methods, such as for instance crystallization or drying.

After separation of the ice crystals from the root- or tuber juice, a concentrated root- or tuber juice is obtained. Concentrated root- or tuber juice comprises at least 30 wt. % protein, preferably at least 35 wt. %, more preferably at least 40 wt. %, such as 30-50 wt. % protein, preferably 30-60 wt. %, more preferably 30-70 wt. % protein. The protein content in concentrated root- or tuber juice is expressed as wt. %, based on dry matter in the juice. The protein content, based on dry matter, can be determined by Sprint™ rapid protein analyzer. The protein in concentrated root- or tuber juice is essentially native protein.

It is a distinct advantage of the present invention that protein obtained by freeze concentration is less degraded and consequently of higher quality than known protein products. Protein obtained by freeze concentration is oxidized and hydrolyzed to a lesser extent than when obtained in another way, such as by absorption chromatography or microfiltration. This can be seen for instance by the carbonyl content. Protein degradation results in carbonylgroups, and as such, the quantity of carbonyl groups ("carbonyl content") reflects the degradatory state of the protein. The less carbonyl groups, the less the protein is degraded. With freeze concentration as presently described, it is possible to obtain a root or tuber isolate which has a lower carbonyl content, and is therefore degraded to a lesser extent, than when the protein is isolated by other methods.

Also, the anisidine value may be used to reflect the protein quality. The anisidine value reflects the quantity of lipid oxidation products, and as such, a higher anisidine value indicates a product of lesser quality. Using freeze concentration as presently described. it is possible to obtain a root or tuber isolate of higher quality.

Thus, the invention similarly pertains to a root or tuber isolate comprising protein which is of high quality and purity, and is not degraded. This root or tuber isolate can be characterized by a carbonyl content of less than 4.7 mmol/kg soluble protein, preferably less than 4 mmol/kg soluble protein. Such a root or tuber isolate is preferably native. Further preferably, the root or tuber isolate has a total color of less than 0.7, preferably less than 0.5.

Concentrated root- or tuber juice can optionally be further concentrated to result in a concentrated root- or tuber juice with a higher protein content. This may be achieved through for instance diafiltration or aqueous two-phase partitioning. This can result in a concentrated root- or tuber juice comprising at least 50 wt. % protein, preferably at least 60 wt. % protein, more preferably at least 65 wt. % protein or even at least 70 wt. % protein, such as 50-90 wt. %, preferably 60-85 wt. %, more preferably 65-85 wt. % protein, based on dry matter.

Diafiltration may be achieved through a 2-15 kDa membrane, preferably a 3-8 kDa membrane, and most preferably a 4-6 kDa membrane, against water or salt solution. The temperature of the concentrated juice during diafiltration should not exceed 30° C., and preferably not exceed 25° C., and more preferably not exceed 18° C.

Aqueous two-phase partitioning is based on partition of the protein of interest predominantly in one phase while contaminants reside substantially all in the other phase, such as has been described in Yuzugullu Y. & Duman Y. A. (2015) Prep Biochem Biotechnol.; 45(7):696-711, "Aqueous two-phase (PEG4000/Na2SO4) extraction and characterization of an acid invertase from potato tuber (*Solanum tuberosum*)".

It is an advantage of the present method that a freeze concentration process results in barely any biological fouling of root- or tuber juice. Thus, the microbiological count of root- or tuber juices and powders obtained from the present method remains low, and there is no substantial coloration during treatment.

Also, the TGA level of root- or tuber juice or powder after treatment is low, and root- or tuber juice or powder develops substantially no Maillard products during treatment.

In addition, scaling and corrosion of equipment is minimized, relative to other methods of concentrating root- or tuber juice.

Also, root- or tuber juice treated with the present method, and products obtained from such juice, are essentially without color. That is different from prior art products, which invariably have a distinct brown-yellow to dark brown color due to chemical and microbiological fouling.

Furthermore, the content of phenolic acids is generally low.

It is a further advantage that root- or tuber juice products and root- or tuber powders obtained by the present method are allergen-free, and generally not derived from genetically modified organisms.

The concentrated root- or tuber juice as obtained using the present method can be further treated to obtain various products. One such product can be a root- or tuber protein isolate. Isolation of a root- or tuber protein isolate at the same time also results in, as a second root- or tuber juice product, a protein-depleted root- or tuber juice comprising free amino acids.

In one embodiment, the root- or tuber protein isolate is a denatured isolate. A denatured root- or tuber protein isolate can suitably be obtained by coagulation, preferably heat or chemical coagulation, of the concentrated root- or tuber juice.

Heat coagulation can be achieved through heating the concentrated root- or tuber juice to above the highest denaturation temperature of any present root- or tuber protein. Preferably, heat coagulation to obtain a denatured root- or tuber protein isolate is achieved by heating the concentrated root- or tuber juice to a temperature of at least 80° C., preferably at least 90° C., for a period of at least 15 min., preferably at least 30 min, more preferably at least 60 min. This results in denaturation and subsequent coagulation of root- or tuber protein, which can subsequently be isolated from the concentrated root- or tuber juice.

Alternatively, denatured root- or tuber protein can be obtained through chemical coagulation. Chemical coagulation can be achieved by addition of chemicals, which have the result of denaturing root- or tuber protein. Suitable chemicals include acids, ammonium sulphate, carboxymethylcellulose, ethanol, manganese chloride and ferric chloride, Suitable acids include for instance hydrochloric acid, sulphuric acid, acetic acid or citric acid, as is known in the art. Preferably, chemical coagulation is acid coagulation. Subsequently, root- or tuber juice comprising coagulated denatured root- or tuber protein can be used for further processing, such as for example isolation of a denatured root- or tuber protein isolate.

Isolation of the denatured root- or tuber protein from the concentrated root- or tuber juice after coagulation can be achieved by any suitable method, such as for example filtration or centrifugation.

Filtration of denatured root- or tuber protein is preferably achieved using filters of 20-250 microns, more preferably 30-200 microns, even more preferably 40-100 microns. Filtration may be achieved in a continuous or a batch process, but preferably, it is a continuous process.

Alternatively, isolation of denatured root- or tuber protein is achieved by centrifugation.

The denatured root- or tuber protein isolate can be used, optionally after further treatment or cleaning, for instance as cattle feed, as source of root- or tuber protein hydrolysates or as source of protein-based adhesive.

In another embodiment, the root- or tuber protein isolate is a native root- or tuber protein isolate. Native, in this respect, means that essentially all protein has retained its natural enzymatic activity, so that the root- or tuber protein isolate is essentially native.

A native root- or tuber protein isolate can be obtained by various methods from the concentrated root- or tuber juice. Suitable methods include for instance filtration, adsorption, chromatography, foam extraction or low temperature isolation.

Filtration to obtain a native root- or tuber protein isolate from concentrated root- or tuber juice is preferably ultrafiltration. Filtration can be achieved by subjecting the concentrated root- or tuber juice to a filter unit which retains native protein.

A preferred way of applying filtration is using ultrafiltration (UF). Ultrafiltration separates solutes in the molecular weight range of 5 kDa to 500 kDa and can therefore be used for the separation of suspended solids, colloids, bacteria and viruses. This includes filtration to remove residual enzymes, such as asparaginase and glutaminase.

UF membranes have pores ranging from 1 to 20 nm in diameter. Preferred UF membranes are anisotropic UF-membranes. The ability of an ultrafiltration membrane to retain macromolecules is traditionally specified in terms of its molecular cut-off (MWCO). A MWCO value of 10 kDa means that the membrane can retain from a feed solution 90% of the molecules having molecular weight of 10 kDa. Preferred MWCO's in the present context are 5-500 kDa membranes, preferably 5-100 kDa, more preferably 5-30 kDa, more preferably 5-10 kDa.

Adsorption to obtain a native root- or tuber protein isolate from concentrated root- or tuber juice can be achieved by chromatography, such as packed bed chromatography, expanded bed chromatography, moving bed chromatography or membrane chromatography. Preferably, adsorption of native root- or tuber protein comprises expanded, fluidized or packed bed adsorption. This results in a native root- or tuber protein isolate solution.

Foam extraction to obtain a native root- or tuber protein isolate from concentrated root- or tuber juice can be achieved by the method described by Weijenberg, D. C., Mulder, J. J., & Drinkenburg, A. A. H. (1978). Ind. Eng. Chem. Process Des. Dev, 17(2), 209-213 "The Recovery of Protein from Potato Juice Waste Water by Foam Separation".

Low temperature isolation to obtain a native root- or tuber protein isolate from concentrated root- or tuber juice can be achieved by pre-treatment at low temperature and low temperature concentration.

After isolation of a native or denatured root- or tuber protein isolate, the root- or tuber protein isolate is preferably dried. Prior to drying the root- or tuber protein isolate may be concentrated, preferably in cases where the isolate is obtained as a native protein isolate solution. Concentration may preferably be achieved by for instance freeze concentration as described above, by cooling the root- or tuber juice to a temperature of −0.3° C. to −16° C. to form ice crystals; and separating the ice crystals from the root- or tuber juice to obtain a concentrated root- or tuber protein isolate.

Concentration may alternatively be achieved by ultrafiltration, diafiltration, as has been described for further concentration of the first root- or tuber juice product, the concentrated root- or tuber juice.

Drying of the root- or tuber protein isolate results in a (native or denatured) root- or tuber protein powder with a water content of at most 10 wt. %, preferably at least 8 wt. %, more preferably at least 5 wt. %. Drying of a root- or tuber protein powder can be achieved by any method, such as freeze drying, spray-drying, vacuum drying or thin film drying, preferably thin film drying, more preferably agitated thin film drying under vacuum.

Freeze drying can be achieved by freezing the liquid material and sublimating the ice under vacuum, using conventional freeze drying equipment such as for instance a Sublimator of Zirbus Technology.

An essentially native root- or tuber protein isolate has various interesting properties. Native root- or tuber proteins can tentatively be divided into three classes (i) the patatin family, highly homologous acidic 43 kDa glycoproteins (40-50 wt. % of the root- or tuber proteins), (ii) basic 5-25 kDa protease inhibitors (30-40 wt. % of the root- or tuber proteins) and (iii) other proteins mostly high molecular weight proteins (10-20 wt. % of the root- or tuber proteins) (Pots A. M., Gruppen H., Diepenbeek R. van, Leem J. J. van der, Boekel M. A. J. S. van, Wijngaard G., & Voragen A. G. J. (1999), J. Sci. Food. Agric., 79, 1557 1564 "The effect of storage of whole potatoes of three cultivars on the patatin and protease inhibitor content; a study using capillary electrophoresis and MALDI-TOF mass spectrometry").

Patatin is a family of glycoproteins that have lipid acyl hydrolase and transferase activities and accounts for up to 40 wt. % of the total soluble protein in root- or tuber tubers.

Protease inhibitors can be divided into different groups based on their molecular weight. The different groups of protease inhibitors are identified as protease inhibitor I (molecular weight of about 39 kDa), carboxypeptidase inhibitor (molecular weight of about 4 100 Da), protease inhibitors IIa and IIb (molecular weight of about 20.7 kDa), and protease inhibitor A5 (molecular weight of about 26 kDa). The ratio of these different groups of protease inhibitors in the total root- or tuber protein depends on the root- or tuber variety. Protease inhibitors from root- or tuber have a broad range of potentially important applications. Protease inhibitors have for instance shown to be useful in the treatment of diabetes, for eliciting satiety in mammals, for reducing the risk of skin cancer, for inhibiting the growth of bacteria, and for preventing or treating inflammation on pruritis of skin and intestine.

A native root- or tuber protein isolate may be a general root- or tuber protein isolate (i.e., comprising substantially all proteins from root- or tuber in their native form), or it may for example be a patatin isolate or a protease inhibitor isolate. Optionally, a native root- or tuber protein isolate can be further fractionated to obtain separate protein fractions, as described above. Preferably, a native root- or tuber protein isolate is a dry root- or tuber protein powder, which may be obtained by the drying methods described above.

Another product which can be obtained from concentrated root- or tuber juice comprises free amino acids. Free amino acids are amino acids which are not incorporated in protein, and are therefore present in concentrated root- or tuber juice as molecularly dissolved species, free in solution.

Free amino acids include the naturally occurring alpha-amino acids alanine, arginine, asparagine, aspartate, cysteine, glutamate, glutamine, glycine, histidine, isoleucine, leucine, lysine, methionine, phenylalanine, proline, serine, threonine, tyrosine, and valine In addition, in the context of the present invention, the gamma-amino acid gamma-amino butyric acid (GABA) is considered an amino acid.

Concentrated root- or tuber juice in general has a favorable free amino acid composition. Free amino acids from root- or tuber can suitably be applied in the form a concentrated root- or tuber juice or a root- or tuber amino acid powder. Because isolation of a root- or tuber protein isolate (native or denatured) does not result in concomitant removal of free amino acids, protein depleted root- or tuber juice also comprises a similarly favorable free amino acid composition. The favorable amino acid composition makes concentrated root- or tuber juice, and also protein depleted root- or tuber juice, an attractive source material to obtain root- or tuber amino acid material, in the form of a concentrated solution or a powder.

Subjecting concentrated root- or tuber juice to any of the above methods to obtain a root- or tuber protein isolate also results in a second root- or tuber juice product, which is a protein depleted root- or tuber juice. Protein depleted root- or tuber juice comprises free amino acids. Protein depleted root- or tuber juice comprises at most 1 wt. % protein, based on dry matter, preferably at most 0.5 wt. %, more preferably at most 0.25 wt. %, even more preferably at most 0.1 wt. %. Remnant protein has a carbonyl content of less than 4.7 mmol/kg soluble protein, preferably less than 4 mmol/kg soluble protein, as follows from the above.

Protein depleted juice may be dried to obtain a root- or tuber powder, comprising free amino acids. This powder may also be called a root- or tuber amino acid powder (AAP). Root- or tuber amino acid powder preferably has a dry matter content of at least 90 wt. %, preferably at least 95 wt. %, more preferably at least 98 wt. %. The dry matter content can be determined by drying the powder in a stove at 102° C. for a maximum of 6 h, after which the sample is cooled in a desiccator. Alternatively, the dry matter content can be determined by freeze-drying. The sample is weighed before drying and after drying and the dry matter content can be calculated. This root- or tuber amino acid powder can be used as a taste ingredient and/or taste enhancer, which confers umami or kokumi taste to a food product. Preferably, the taste ingredient and/or taste enhancer confers umami taste. In an alternative preferred embodiment, the taste ingredient and/or taste enhancer confers kokumi taste. In preferred embodiments, the root- or tuber amino acid powder is used as a vegetable extract enhancing flavor, or as a flavoring preparation, as a natural flavoring or as a food ingredient.

Prior to drying to obtain a root- or tuber amino acid powder, it may be preferred to concentrate the protein depleted juice, such as for instance by freeze drying as described above, such as by cooling the root- or tuber juice to a temperature of −0.3° C. to −16° C. to form ice crystals; and separating the ice crystals from the protein depleted root- or tuber juice to obtain a concentrated protein depleted juice. Alternatively, any of the methods described above for concentrating a root- or tuber juice described above may also be applied to concentrate protein depleted root- or tuber juice. Further alternatively, can suitably be applied to concentrate protein-depleted juices.

Preferably, a concentrated protein depleted juice has a dry matter content of at least 30 wt. %, preferably at least 40 wt. %, more preferably at least 50 wt. %, even more preferably at least 60 wt. %, and even more preferably at least 70 wt. %.

Generally, concentration and drying of protein depleted juice may be achieved by any of the above methods described for concentration and drying of (protein-comprising) root- or tuber juice, or for root- or tuber protein isolate solutions and-powders.

Optionally, the method of the invention comprises a step of reducing the content of triglycoalkaloids ("TGA") to below 800 mg/kg dry matter, preferably below 400 mg/kg dry matter, more preferably below 320 mg/kg dry matter, more preferably below 200 mg/kg dry matter, even more preferably below 100 mg/kg dry matter. This step may be before or after the present method, or it may be an intermediate step. The quantity of TGA can be determined by the method of Alt and coworkers (Alt V., Steinhof R., Lotz M., Ulber R, Kasper C., & Scheper T. (2005) Eng. Life Sci. 2005, 5, No. 6 "Optimization of Glycoalkaloid Analysis for Use in Industrial Potato Fruit Juice Downstreaming").

Suitable methods to reduce the quantity of TGA are known in the art, and include for instance absorption, extraction, and thermal or enzymatic or microbial degradation.

Absorption of TGA may preferably be achieved by the methods described in WO 2008/056977 or WO2008/069651. Briefly, these methods include absorption of glycoalkaloids from root- or tuber juice to active carbon or clay, and subsequent filtration of the root- or tuber juice to remove the clay or activated carbon and obtain a root- or tuber juice from which TGA has been removed.

TGA may also be removed by heating, in a similar procedure as described above for isolating a denatured root- or tuber protein isolate.

Thus, the invention equally pertains to a root- or tuber juice product or root- or tuber amino acid powder, obtainable by the present method, with a dry matter content of at least 25 wt. %, comprising, as a percent of dry matter, at least 16 wt. % free amino acids, which free amino acids comprise as a wt. % of free amino acids, at least 20 wt. %, preferably at least 25 wt. % of the sum of glutamine, glutamate and gamma-amino butyric acid and at least 25 wt. %, preferably at least 30 wt. % of the sum of asparagine and aspartate, wherein the total color of the concentrated root- or tuber juice, determined as the sum of the absorbance at 420, 520 and 620 nm on a 4.5 wt. % solution in demineralized water, is less than 0.7, preferably less than 0.6, more preferably less than 0.5. The root- or tuber juice product can be a concentrated root- or tuber juice or a protein depleted root- or tuber juice, as described above.

Preferably, the root- or tuber juice product or root- or tuber amino acid powder, obtainable by the present method has a dry matter content of at least 30 wt. %, preferably at least 40 wt. %, more preferably at least 50 wt. %. In a much preferred embodiment, the root- or tuber juice product is subjected to the concentration and/or drying steps defined above, to obtain a root- or tuber amino acid powder, preferably with a dry matter content of at least 90 wt. %, preferably at least 95 wt. %, more preferably at least 98 wt. %.

The root- or tuber juice product or root- or tuber amino acid powder comprises at least 16 wt. % free amino acids, as a percent of dry matter. Preferably, the dry matter comprises at least 19 wt. %, more preferably at least 21 wt. %, more preferably at least 23 wt. %, even more preferably at least 25 wt. % amino acids.

The amino acids in the dry matter of root- or tuber juice products or root- or tuber powder comprise at least 20 wt. %, preferably at least 25 wt. %, more preferably at least 30 wt. % of the sum of glutamine, glutamate and gamma-amino butyric acid and at least 25 wt. %, preferably at least 30 wt. %, more preferably at least 34 wt. % of the sum of asparagine and aspartate. Generally, the quantity of a certain amino acid in a root- or tuber juice product or a root- or tuber powder is expressed as a wt. % of free amino acids (including GABA).

Preferably, the sum of glutamine, glutamate and gamma-amino butyric acid comprises at least 10 wt. % glutamate, preferably at least 20 wt. % glutamate, more preferably at least 30 wt. % glutamate. Also, the sum of asparagine and aspartate preferably comprises at least 15 wt. % aspartate, more preferably at least 20 wt. %.

In a much preferred embodiment, the method of the invention comprises a step wherein protein depleted root- or tuber juice is subjected to an enzymatic treatment. Preferred enzymatic treatments include conversion of the free amino acid asparagine to asp artate, and/or the free amino acid glutamine to glutamate and/or optionally to gamma-amino butyric acid, or an enzymatic treatment to convert RNA to 5'-GMP and/or 5'-AMP. Such methods may include exogenous or endogenous enzymes.

Enzymatic treatment of root- or tuber can be achieved by exposing a root- or tuber juice to the action of the desired enzymes under pH and temperature conditions that are appropriate for each specific enzyme. These conditions overlap to an extent.

Suitable enzymes to convert the free amino acid asparagine to aspartate include for instance PreventAse (DSM), Acrylaway (Novozymes), Crisantaspase, Colaspase, Elspar and Erwinase, preferably PreventAse.

It is preferred if enzymatic treatment occurs at a pH at a pH of 4.5-7, preferably 5.0-6.7, more preferably 5.5-6.5. Further preferred is a temperature of 20-70° C., more preferably 34-45° C.

The dose of enzyme is very enzyme-dependent, but preferably, the enzyme dosage is less than 4000 ppm, preferably less than 1000 ppm, more preferably less than 500 ppm.

Suitable enzymes to convert the free amino acid glutamine to glutamate include for instance Glutaminase SD-100CS (Amano Enzymes, JP) at pH 5.0-7.0, preferably 6.2 to 6.8, more preferably about 6.5. Further preferably, the temperature is between 40-70° C., preferably 50-70° C., more preferably 55-65° C.

In a further preferred embodiment, the enzyme dosage is below 1000 mg/L, preferably below 500, more preferably below 250. Alternatively, PreventAse (DSM), under the conditions mentioned above, can also be used to effect the conversion of asparagine to aspartate.

Preferably, the enzymatic conversion of glutamine results in glutamate. Optionally the glutamate produced in this way can be converted to gamma-amino butyric acid. This can be achieved by enzymatic conversion, for instance using glutamate decarboxylase. In a much preferred embodiment, glutamate decarboxylase is present endogenously in root- or tuber juice to effect the conversion of glutamate to GABA.

Another preferred method comprises an enzymatic treatment to convert RNA to 5'-GMP and/or 5'-AMP. Suitable enzymes include for instance RP-1 (Amano enzymes, JP) at a temperature of 65-75° C., preferably 70° C. and at pH between 4 and 7, preferably between 4.5 and 6.0, preferably about 5.0.

In an alternative preferred embodiment, endogenous nuclease enzymes form root or tuber juice effect the conversion of RNA to 5'-GMP and/or 5'-AMP. This preferably occurs at a pH of between 6 and 9, preferably between 7 and 8, more preferably about 7.5. Further preferably, the temperature is between 60 and 75° C., preferably about 70° C.

In a much preferred embodiment, a treatment effecting the conversion of RNA to 5'-GMP and/or 5'-AMP is combined with Deamizyme 50.000 (Amano enzymes) to convert 5'-AMP into 5'-IMP.

Any enzymes remaining in solution after the enzymatic conversions described above may be removed, for instance by ultrafiltration, as is known in the art and described above. Accordingly, the invention furthermore pertains to a method as described above, further comprising an ultrafiltration step to remove residual enzymes.

Such conversions may for instance increase the level of glutamate relative to glutamine, and the level of aspartate relative to asparagine, or increase the content of 5'-GMP and/or 5'-AMP and or 5'-IMP. Preferably, such treatment results in a root- or tuber juice product or root- or tuber amino acid powder wherein the sum of glutamine, glutamate and gamma-amino butyric acid comprises at least 90 wt. % glutamate, preferably at least 95 wt. % glutamate, and wherein the sum of asparagine and aspartate preferably comprises at least 90 wt. % aspartate, preferably at least 95 wt. %. This embodiment is particularly preferred when the root- or tuber juice product or root- or tuber amino acid powder is to be used as a taste ingredient and/or enhancer.

Further preferably, the content of 5'-GMP and/or 5'-AMP and or 5'-IMP is at least 400 mg/kg dry matter, preferably at least 600 mg/kg dry matter, more preferably at least 900 mg/kg dry matter, and most preferably at least 1000 mg/kg dry matter. This embodiment is particularly preferred when the root- or tuber juice product or root- or tuber amino acid powder is to be used as a taste ingredient and/or taste enhancer.

An alternative preferred product in this context comprises at least 18 wt. % asparagine and/or at least 40 wt. % aspartate, and/or at least 5 wt. % GABA, expressed as wt. % of free amino acids.

In addition, a root- or tuber juice product or root- or tuber amino acid powder, obtainable by the present method, preferably has a free amine content of at least 1000 mmol/kg dry matter, preferably at least 1400 mmol/kg dry matter, more preferably at least 1500 mmol/kg dry matter, even more preferably at least 1800 mmol/kg dry matter, even more preferably at least 2400 mmol/kg dry matter as determined by OPA analysis.

The free amine content can be determined by reaction of the concentrated root- or tuber juice or root- or tuber powder at 0.1 wt. % concentration with ortho-phthaldehyde ("OPA") reagent and subsequent analysis at 340 nm.

Also, a root- or tuber juice product or root- or tuber amino acid powder, obtainable by the present method, preferably has a microbiological count, determined by total viable aerobic count plating according to ISO 4833-1/2013, of below $10^4$ CFU/gram, preferably below $10^3$ CFU/gram.

Furthermore, a root- or tuber juice product or root- or tuber amino acid powder, obtainable by the present method, preferably has a content of phenolic acids of less than 500 mg/kg DM, preferably less than 400 mg/kg DM, more preferably 300 mg/kg DM.

Also, a root- or tuber juice product or root- or tuber amino acid powder, obtainable by the present method, preferably has a concentration of glycoalkaloids below 800 mg/kg dry matter, preferably below 400 mg/kg dry matter, more preferably below 320 mg/kg dry matter, more preferably below 200 mg/kg dry matter, even more preferably below 100 mg/kg dry matter.

Also, a root- or tuber juice product or root- or tuber amino acid powder, obtainable by the present method, preferably has a low content of Maillard products. Maillard products are products that form naturally from various endogenous compounds during known isolation protocols. As such, their formation should be suppressed as much as possible. The quantity of Maillard products can be estimated by the quantity of hydroxymethylfurfural. The quantity of hydroxymethylfurfural should preferably be less than 5 mg/kg dry weight, preferably less than 2.5 mg/kg dry weight, more preferably below 1 mg/kg dry weight. Furthermore, furosines, which are another indicator of Maillard products, are preferably below 300 mg/kg dry matter, more preferable below 100 mg/kg dry matter, even more preferably below 5 mg/kg dry matter and most preferably below 4 mg/kg dry matter.

Maillard products are products formed whenever reducing sugars occur together with amino compounds such as proteins, peptides, amino acids, or amines. The determination of Maillard products includes many different products as there is not just one pathway for the Maillard reaction. The Maillard reaction can be followed by measuring the amount of free primary amino groups using the ortho-phtaldialdehyde assay. Alternatively, product advancement in the form of furosines can be determined, and hydroxymethylfurfural can be determined with HPLC and a photometric UV-detector, according to the protocol of Jeuring and Kupers (Jeuring J. & Kuppers F., (1980) J. Ass. Off. Anal. Chem. 63, 1215 ("High Performance Liquid Chromatography of Furfural and Hydroxymethylfurfural in Spirits and Honey").

Also, a root- or tuber juice product or root- or tuber amino acid powder, obtainable by the present method, preferably has a content of 5'-nucleotides 5'-GMP and 5'-AMP and 5'-IMP of at least 400 mg/kg dry matter, preferably at least 600 mg/kg dry matter, more preferably at least 900 mg/kg dry matter, most preferably at least 1000 mg/kg dry matter.

It is a further advantage of the present method that in order to obtain products and juices essentially without color as defined elsewhere, no further treatments, such as anion exchange or activated charcoal treatment, is required. These treatments may, however, be applied in order to achieve other purposes, such as TGA removal, or to remove organic acids.

Root- or tuber amino acid powders or protein-depleted root- or tuber juices of the invention can favorably be used as a taste ingredient and/or taste enhancer, for example in the form of an additive. These compositions provide a strong umami or kokumi taste to a food product. Thus, the invention equally pertains to use of root- or tuber free amino acids as a taste ingredient and/or taste enhancer in food applications.

Umami taste is generally seen as savory taste. It is the fifth taste next to the four basic tastes sour, sweet, bitter, and salt. The umami taste is mainly attributed to glutamate, but can be promoted by 5'ribonucleotides, aspartate, and potassium. The umami taste by glutamate can also be enhanced and replaced by gaba in a compensatory proportion. This leads to a substantial reduction of glutamate and a low glutamate (MSG) umami product.

Kokumi taste is thought to have no taste of its own, but to act as taste enhancement. It is said to induce mouthfulness, richness, and continuity of taste, but also to provide an initial taste punch. The exact mechanism is not yet fully understood.

Preferably, the composition provides a strong umami taste. Alternative preferred compositions provide a strong kokumi taste.

The protein depleted root- or tuber juice or root- or tuber amino acid powder of the invention is therefore highly suitable to apply in savory food applications, such as broths, bouillons, noodles, dressings, seasonings, sauces, ready-made meals or meal kits, or parts thereof, fonds, sauces, condiments, spice or herb compositions or, marinades.

Addition to food products can be at any desired concentration, such as 0.1-2.0 wt. %.

In addition, the amino acid isolate can be used as a food supplement.

For the purpose of clarity and a concise description features are described herein as part of the same or separate embodiments, however, it will be appreciated that the scope of the invention may include embodiments having combinations of all or some of the features described.

The invention will now be illustrated by the following, non-limiting examples.

Determination of Total Color

All samples were diluted to 5.0 Bx (corresponding to 4.5 wt % of dry matter) and centrifuged at 14.000 rpm in an Eppendorf centrifuge for 10 minutes to remove insolubles. Materials whose brix values were below 5 were centrifugated as is. 2 Aliquots of 1 mL of the supernatant of each sample were introduced in a cuvet and placed in a BioRad SmartSpec Plus spectrophotometer. Absorbances were read in duplicate at 420, 520 and 620 relative to a demiwater blank, and summed. If the absorbance was higher than 1, the sample was accurately diluted in demiwater until absorbance could be read.

Determination of Dry Matter Content 2 g aliquots of samples on pre-weighed aluminium evaporation plates were accurately weighed on an analytical balance with a standard error of below 1 mg. The samples were introduced in a vacuum drying chamber operating at 50° C. at pressures below 50 mbar and dried overnight. The plates were removed from the drying chamber, allowed to cool to ambient temperature and weighed again. The dry matter content was then calculated from the mass differences.

Determination of Free Amine Level

Samples were analyzed for free $NH_2$ groups by monitoring the specific reaction between amine groups and orthophthalaldehyde (OPA, CAS 643-79-8).

A stock solution of OPA (SigmaAldrich, 00681) was prepared by dissolving 5 mg of OPA in 100 µL of 96% ethanol. 5 µL of 2-mercaptoethanol (Merck, 8.05740.0250) were added. When all material was dissolved in the ethanol, 10 mL of a 100 mM carbonate buffer at pH 10.5 were added. This reagent was stored away from direct light and used within the hour. Samples were accurately diluted to an approximate concentration of 0.1 wt. %. 20 µL of diluted sample was added to 180 uL of the OPA stock solution and incubated in the dark for exactly 1 minute and 30 seconds, upon which the absorbance at 340 nm was read using a ThermoScientific Multiskan GO platereader.

Amine content was determined against a calibration curve prepared from a glutamic acid standard solution at concentrations between 0 and 5 mM.

Determination of Amino Acid Content

Samples were subjected to amino acid analysis using HPLC-UV/FLU and/or Biochrom amino acid analyzers using classical ion-exchange liquid chromatography with post-column Ninhydrin derivatisation and photometric detection, as is known in the art.

Determination of Glycoalkaloid Level

The level of triglycoalkaloid (TGA) in the root or tuber samples was determined essentially according to the method of Alt and coworkers ((Alt V., Steinhof R., Lotz M., Ulber R, Kasper C., & Scheper T. (2005) Eng. Life Sci. 2005, 5, No. 6 "Optimization of Glycoalkaloid Analysis for Use in Industrial Potato Fruit Juice Downstreaming").

Briefly, samples were dissolved or diluted in 5% acetic acid solution containing 20 mM of heptane sulfonic acid sodium salt (VWR 152783K) for at least 2 hours. Insoluble materials were removed by centrifugation at 9000 g at ambient temperature (Heraeus Multifuge 1 SR, rotor 75002006) and the supernatant was filtered over a GHP Acrodisc 13 mm Syringe Filter with 0.45 µm GHP Membrane (PALL PN 4556T) directly into a 1.5 mL HPLC vial (VWR 548-0004) and capped with an aluminium ci 11 mm, rubber/butyl/TEF cap (VWR 548-0010). Samples were introduced automatically onto a SPE column (Oasis HLB prospect-2/Symbiosis cartridge 2.0×10 mm particle size 30 µm) via a Robotlon online SPE system (Separations). The glycoalkaloids were eluted onto a Hypersil ODS C18 (250 mm×4.6 mm 5 µm) column and separated using 50% acetonitrile/phosphate buffer pH 7.6. Analytes were detected using Smartline UV detector 2520 (Knauer) and quantified on a calibration curve prepared from purified glycoalkaloids (α-solanine, Carl Roth 4192,1 and α-chaconine Carl Roth 2826,1).

Determination of Total Phenolic Acid Content

A root or tuber contains two major species of phenolic acids which are characterized by their high specific molecular absorbance at 326 nm, namely chlorogenic acid and caffeic acid, the first of which is by far the most abundant. Total phenolic acid content was determined by measuring the absorbance at 326 nm of root or tuber juice samples, by reference to a calibration curve constructed from purified chlorogenic acid (0-5 ug/mL, Caymans Chemical Company 70930). Phenolic acid levels ("CGA") were then calculated via linear regression.

Determination of Total Suspended Solids

Root or tuber juice was diluted to a dry matter content of 4.5 wt. %, and the absorbance at 620 nm was determined using a UV/Vis spectrophotometer (BioRad SmartSpec Plus) in 1 cm pathlength cuvets against demineralized water. For samples with a higher absorbance then 1, accurate dilutions were prepared in demineralized water until the absorbance was below 1. The reported values were then corrected for this dilution. For samples having a lower dry matter content, the determination was made on a decreased dry matter content, and mathematically converted to a dry matter content of 4.5 wt. %.

Determination of Lipid Content

The lipid content in samples was determined by the method of Matyash and coworkers (Matyash V., Liebisch G., Kurzchalia T. V., Shevchenko A., & Schwudke D., (2008) J Lipid Res.; 49(5):1137-46 "Lipid extraction by methyl-tert-butyl ether for high-throughput lipidomics").

Determination of Total Color

Total color is determined as the sum of the absorbance at 420, 520 and 620 nm on a solution of 4.5 wt. % solids. Samples were centrifuged at maximum rpm in Eppendorf tubes prior to measurement to prevent turbidity from contributing to the color. For juices which have a different solid content, the solution can for instance be diluted to 4.5 wt. % to determine the total color directly, or the total color may be obtained mathematically by adjusting for the solids content, for example in case the solid content of the juice is lower than 4.5 wt. %. Total color can be abbreviated "color".

Example 1: Production of FC Potato Juice

Production of Potato Juice Concentrate by Freeze-Crystallization

Potato juice was prepared from industrial starch potatoes. The material was either pretreated by flocculation at reduced temperature or used as is. Untreated potato juice contained 42±7 g of lipids per kg of dry matter.

Flocculation of potato juice was performed by a low-temperature version of a flocculation procedure. Briefly, flocculation was performed by cooling 900 L of potato juice to 15° C. and introducing 11 mg/L of polyacrylamide (Superfloc A150, Kemira), 650 mg/L of polytannine (Bio20, Servyeco) and 50 mg/L of k-carrageenan (Gelcarin GP812, FMC biopolymer). This treatment reduced the lipid content to below 25 g/kg dry matter in the potato juice. The low temperature regime changed the initial sedimentation velocity of the flocs from 8 cm/h to 50 cm/h. Protein was removed from the juice by passing it over a 5 kDa PES ultrafiltration membrane (Koch).

The clarified potato juice and untreated control juice were separately subjected to freeze concentration in a freeze concentration unit (EFC separations BV and Thorlce). Liquids were precooled to 1 C and introduced into a crystallization chamber operating at temperatures between −0.3° C. and −16° C. to form an ice slurry.

The slurry ice produced by the generator is a low temperature "slush," made of many small crystals created by scraping the inside of a Thor-Ice generator. (Thor-Ice, Iceland) The ice crystals are small compared to chunk of flake ice. The small slurry ice particle results in greater heat transfer than any other type of ice. The spherical crystals in the ice particles exhibit good flow properties, which allows for easy circulation through conventional pumps and piping. The small sized crystals flow into crevices and provide greater surface contact and, hence, much faster cooling rates than other traditional forms of ice cooling (such as flake, block or shell).

Unique feature of this ice machine is the fact that it has been developed with a modular technology (Thor-Ice). Scaling up of the process is done by scaling out. Slurry ice can be produced with different density levels, ranging from 10% to over 90%, thanks to the adaptive freezing device that adjusts/balances the cooling capacity to the process stream and heat transfer. Ice blocking is prevented by a control system which delivers warm refrigerant into the heat exchange surface when the torque generated by the scrapers exceeds a certain value.

The exact juice freezing temperature at any given moment depended on the level of dissolved solids. The amount of energy to be given to the system is automatically regulated by the ice machine which will keep the ice production constant, regardless of the juice concentration. Ice crystals were recovered continuously over a vacuum belt filter, equipped with an 80 micron filter cloth, and were washed with precooled juice (1° C.), which was reintroduced into the crystallization chamber. The above mentioned washing is used to increase ice purity and at the same time that liquid is used to feed the reactors. Ice was recovered with a rate of max 220 kg per hour. (between 100 and 220 kg/h).

At this stage, the untreated potato juice failed to filtrate nearly immediately due to fouling, while the clarified, deproteinated juice concentrated up to 40 wt. % dry matter without any noticeable clogging.

In a separate experiment, potato juice obtained from a starch extraction process was subjected to a lipid-removal pretreatment using flocculation as described above, and compared to a raw juice. Thus, a lipid-free, protein containing juice was compared to a lipid-containing, protein containing juice. The lipid removal resulted in concomitant removal of TSS, as can be seen by the absorbance at 620 nm of the lipid-free juice of 0.3, and the absorbance at 620 nm of the lipid-containing juice of 6.5.

In this case, also, lipid removal resulted in effective freeze concentration, whereas the lipid-containing juice could not be subjected to freeze concentration because the filters clogged immediately.

Various different pretreatments (microfiltration, centrifugation, flocculation, disk stack separation; see table 1) were performed to achieve lipid removal. In all cases except when using low-speed centrifugation, the results were comparable to described above in terms of crystallization temperatures and filterability. Using microfiltration, high-speed centrifugation and flocculation, freeze concentration of potato juice was possible. Using low-speed centrifugation, the filterability was such that freeze concentration could not be performed.

Microfiltration: potato juice is sent through a special pore-sized membrane (0.1 to 10 μm) to separate microorganisms and suspended particles. The untreated juice is passed through at a relatively high velocity of around 1-3 m/s and at low to moderate pressures (around 100-400 kPa) parallel or tangential to the semi-permeable membrane in a sheet or tubular form. A pump is commonly fitted onto the processing equipment to allow the liquid to pass through the membrane filter.

High-speed centrifugation. 20 mL of potato juice were subjected to centrifugation at 10.500 g for 10 minutes Low-speed centrifugation. Potato juice was centrifuged for 1 minute at 2900 g to simulate the g-force and residence time that potato juice typically experiences in industrial potato juice processing Separator: A disc stack separator separates the solids in one single continuous process, using high centrifugal forces. When the denser solids are subjected to such forces, they are forced outwards against the rotating bowl wall, while the less dense liquid phases form concentric inner layers. Inserting special plates (the "disc stack") provides additional surface settling area, which contributes to speeding up the separation process.

A disc stack separator features four main sections.
1. Inlet zone: The inlet zone accelerates the juice up to the speed of the rotating bowl. Good inlet design also prevents foaming, reduces the sheer forces in the product, minimizes temperature increases and avoids disturbance of the separation processes taking place in the bowl.
2. Disc stack area: the suspended (and heavier) particles are conveyed into the space between the discs while it is collected in the solid discharge section
3. Liquid discharge section: Once separated, the fat-free potato juice is conveyed out of the separator, from the top of the equipment.
4. The solid discharge section: The removed solids are continuously expelled from this section, at the bottom of the machine.

TABLE 1

Pre-treatments with corresponding dry matter content (%), total suspended solids content (OD 620 nm) and lipid content (%), and the possibility to perform freeze concentration.

| Pre-treatment type | DM content (%) | Total suspended solids (OD 620 nm) | Lipid content (g/kg dry matter) | FC possible |
| --- | --- | --- | --- | --- |
| Without pre-treatment | 7.7 ± 0.9 (n = 2) | 6.8 ± 1.1 (n = 5) | 42 ± 7 (n = 20) | no |
| Microfiltration (0.45 μm) | 7.0 ± 0.1 (n = 2) | 0.81 ± 0.11 (n = 3) | 11.5 ± 0.2 (n = 2) | yes |
| Low speed centrifugation (2900 g, 1') | 7.2 ± 0.1 (n = 2) | 3.8 ± 0.2 (n = 2) | 39 ± 10 (n = 22) | no |
| High speed centrifugation (10500 g, 10') | 7.0 ± 0.1 (n = 2) | 0.80 ± 0.09 (n = 2) | 10 ± 3 (n = 2) | yes |
| Flocculation | 6.8 ± 0.1 (n = 2) | 0.41 ± 0.1 (n = 10) | 11.5 ± 0.2 (n = 2) | yes |

Example 2: Permissive Levels of Suspended Solids

Efficient freeze concentration of untreated potato juice is hampered by the fact that suspended solids in the juice clog the filters that are intended to remove small ice crystals. While some minor level of suspended solids can be tolerated, higher levels become more and more problematic. The permissive level of suspended solids, expressed as turbidity, was investigated in a potato juice that was passed over a 40 micron filter cloth at a 0.2 bar pressure differential.

A flocculated potato juice as described in example 1 was mixed with potato "cold fraction" (i.e., a quantity of potato juice as available prior to flocculation) to form mixtures with controlled quantities of suspended solids. These mixtures were passed over a 40 micron filter cloth (Sefar 07-40/25) that covered a 55 mm diameter Büchner funnel at a pressure difference of 0.2 bar, maintained by a VCP-80 pump (VWR). The amount of liquid that passed over the filter cloth until such time as the filter became clogged, was recorded up to a maximum of 1 liter.

TABLE 2

Effect of turbidity on the quantity of potato juice that passes over a 40 micron filter cloth until clogged.

| Total suspended solids (OD620) | mL until clogged |
|---|---|
| 1.700 | 1000 (not clogged) |
| 1.913 | 1000 (not clogged) |
| 2.125 | 1000 (not clogged) |
| 2.444 | 690 |
| 2.763 | 160 |
| 3.188 | 240 |
| 3.826 | 80 |
| 22.960 | 150 |

As the results demonstrate, increased levels of TSS cause clogging of the filter. As will be understood by the person skilled in the art, clogging can be reduced by increasing filter porosity, addition of filter aid, or any type of operating where the filter is continuously cleaned. Nevertheless, increased levels of suspended solids are harmful to the economy of the freeze concentration process in all cases.

Example 3: Permissive Levels of Lipids

The presence of lipids in potato juice precludes application of freeze concentration. Potato lipids have a tendency to interfere with ice crystal formation. In lipid-free conditions, defined as at most 28 g/kg dry matter lipid, and preferably less, freeze concentration results in a "slush" of ice crystals that are dispersed among liquid water that contains dissolved potato components. As more and more water freezes into ice crystals, that liquid becomes ever more concentrated.

If, in contrast, high levels of lipids material are present, no proper ice slush/water system is formed but instead an "ice cream"-like texture is formed that incorporates all components that were originally present in the juice.

This phenomenon seems analogous to that of ice-making in which the inclusion of lipids results in an "ice cream" while the absence of lipids gives rise to a "sorbet" type of ice.

The effect of increasing quantities of lipids in potato juice was determined by performing freeze concentration on potato juice mixtures with defined lipid contents. These mixtures were prepared by mixing a potato juice that was clarified by flocculation according to example 1 with a lipid-rich potato "cold fraction" (i.e., a quantity of potato juice as available prior to flocculation). 30 mL aliquots of these mixtures were then introduced into a stainless steel bowl that was cooled continuously with ethanol at −20° C. Stirring was provided by a mechanical top mixer operating at 200 rpm. The resulting material was evaluated by visual inspection.

Example 4: Comparison of the Product Obtained by Lipid Removal and Subsequent Freeze-Concentration with Products Obtained by Known Treatments The material in example 1 (referred to as "sample 1" and labelled "FC" within this example) was compared to different preparations that were made based on methods from the literature, as described below.

Sample 2, Potato juice "as is": Industrial starch potato tubers (*Solanum tuberosum* Seresta) were grated on an kitchen top juicer (Braun) equipped with a grating disc. The juice, substantially free from starch and fibers, was used "as is".

Sample 3 "GB", Potato protein solution according to Edens et al 1997 "Novel Food Composition" WO 97/42834: 1500 mL of potato fruit juice was supplemented with 4.5 g of $CaCl_2*2\ H_2O$ (SigmaAldrich C3881) and 2.7 g of $Na_2HPO_4*2\ H_2O$ (Merck 1.06580) and stirred for 5 minutes. The pH was adjusted to 7.5 using a 5M NaOH solution. The potato juice was cleared from particulate matter by centrifugation for 1 minute at 4500 rpm in a Mistrall 6000 centrifuge using a 6-bucket windshielded rotor. The supernatant was collected and concentrated on an ultrafiltration unit loaded with a 10 kDa polyethersulfon MWCO membrane (Millipore, PGLC 15005) operating at 3 bar. After ultrafiltration the concentrate was diluted with demineralised water containing 200 mg/L of $NaHSO_3$ (Merck, 1.06657) and subjected to diafiltration in a sample that was diluted to 1% w:v protein concentration. The resulting protein solution was lyophilised and stored at ambient temperature until used.

Sample 4 "PM" was Protamylasse (Avebe), obtained from the potato starch factory at Gasselternijveen, The Netherlands. Protamylasse is a concentrate of the juice that is left after coagulation of protein from potato juice.

Samples 5 "UL" and 6 "UL+AC" were prepared according to the method described in Batenburg et al 2015 "Potato derived flavor enhancing composition and method for the manufacture thereof", WO2015000606, with ("UL+AC") and without ("UL") an activated carbon treatment.

2 kgs of industrial starch potatoes (Potato starch factory at Gasselternijveen, Avebe) were grated on a kitchen top juicer equipped with a grater disc. The juice was filtered over a no. 2 sintered glass filter (Robu H11, Borosilicate) and again over an S&S 595 büchner filter (Schleicher & Shüll, 311.611). Protein was removed by boiling the solution for 8 minutes on a hot plate and filtering of the precipitate. The filtrate was cooled with icewater and either kept as is (sample 5) or treated with 10 g/L of Norit CA Plus Activated Carbon overnight at 4° C. (sample 6). The bulk of the carbon was removed by filtration over S&S 595 büchner filter while the fines were removed over a 0.45 micron filter (Pall, PN AP-4438T).

Sample 7 "Liquid fraction from floc" was prepared by flocculation potato juice according to the method in patent application EP 14183425.9. Solid material was extracted with an equal volume of water, yielding the sample.

TABLE 4

Comparison of obtained product with the product obtained in various known processes.

| | Sample no. | | | | | | |
|---|---|---|---|---|---|---|---|
| | 1 | 2 | 3 | 4 | 5 | 6 | 7 |
| Label | FC | PJ as is | GB | PM | UL | UL + AC | Liquid fraction from floc |
| mmol amine/kg DM | 1.550 | 1.346 | 764 | 1.367 | 1.709 | 1.725 | 1.475 |
| mg CGA/kg DM | 277 | 824 | 624 | 557 | 532 | 77 | 651 |
| Color at 4.5% DM | 0.26 | 2.54 | 4.67 | 0.76 | 1.94 | 0.74 | 0.70 |
| wt. % Dry Matter ("DM") | 26.7% | 9.1% | 90% | 60% | 6.5% | 5.9% | 3.6% |
| Alanine | 9.5 | 4.2 | a | 3.3 | 4.5 | 4.6 | 20.5 |
| Arginine | 11.7 | 14.7 | | 8.2 | 14.8 | 13.0 | nd |
| Asparagine | 55.6 | 46.9 | | 43.0 | 48.4 | 54.3 | 27.6 |
| Aspartic acid | 6.0 | 7.3 | | 12.6 | 7.1 | 7.3 | 0.5 |
| Cysteine | nd | nd | | nd | nd | nd | 1.0 |
| γ-amino butyric acid | 25.5 | 17.3 | | 8.6 | 22.1 | 22.3 | 20.5 |
| Glutamine | 27.2 | 20.6 | | 1.0 | 17.8 | 19.4 | 11.9 |
| Glutamic acid | 6.4 | 11.7 | | 11.1 | 4.2 | 4.4 | 3.3 |
| Glycine | 0.6 | 0.5 | | 0.4 | 0.5 | 0.5 | 1.4 |
| Histidine | 2.1 | 1.7 | | 1.4 | 1.7 | 1.5 | 1.4 |
| Isoleucine | 1.8 | 1.7 | | 1.5 | 1.8 | 1.9 | 3.3 |
| Leucine | 1.7 | 1.2 | | 1.0 | 1.2 | 1.4 | 4.8 |
| Lysine | 2.8 | 4.4 | | 3.1 | 4.5 | 4.7 | 5.7 |
| Methionine | 1.6 | 1.2 | | 1.1 | 1.2 | 1.0 | 1.9 |
| Phenylalanine | 1.0 | 2.7 | | 1.7 | 2.6 | 1.7 | 4.3 |
| Proline | 3.3 | 1.9 | | 1.1 | 2.0 | 2.2 | 1.4 |
| Serine | 2.7 | 2.4 | | 2.0 | 2.3 | 2.5 | 4.3 |
| Threonine | 2.2 | 1.4 | | 1.4 | 1.5 | 1.7 | 3.3 |
| Tyrosine | 1.2 | 2.7 | | 2.2 | 2.8 | 1.7 | 1.4 |
| Valine | 3.9 | 5.2 | | 4.0 | 5.4 | 5.6 | 6.2 |
| pyroglutamate | 0.4 | | | 15.2 | 6.9 | | |
| Furosine (mg/kg DM) | 3.9 | | | 291.7 | 5.2 | | |
| HMF | nd | | | 2.5 | nd | | |
| g free a.a/kg DM | 166.8 | 149.6 | | 108.5 | 146.4 | 151.6 | 124.8 | a) Protein-rich sample which does not contain meaningful levels of free amino acids
b) Amino acid levels are expressed as gram amino acid per kg dry sample matter
c) CGA = chlorogenic acid, the main phenolic acid in potato.
d) HMF = hydroxymethylfurfural, an important indicator for Maillard products.
e) nd = not detected The total color, which is higher with further degradation of the juice' components, is much lower when the product has been obtained through freeze concentration.

Heat-treated potato juice contains reduced levels of glutamine and increased levels of pyroglutamate. In addition, exposure to heat results in an increase in the early maillard product furosine. Extensive heat-treatment results in detectable levels of hydroymethylfurfural (HMF).

Example 5: Energy Requirement

The concentration of potato juice solution is basically an enrichment of the solid phase at the expenses of the liquid one. This separation can be achieved in many ways, mainly by mechanical separation or phase change. Phase change concentration instead is performed by increasing or decreasing the temperature of a given solution (water mixture). Starting at ambient conditions, water can be evaporated or frozen; however, the energy penalties (to be regarded as primary energy) associated with these phase changes are 2260 kJ/kg and 334 kJ/kg at 1 bar, respectively.

Hence, the main drawbacks of heating treatment are the high energy consumption and heat induced deterioration of sensory (color changes, off-flavor formation) and nutritional characteristics.

Thermal Concentration

Currently proteins removal and concentration of the potato juice until dry matter content of 55% (protamylasse production) are performed via heat treatments.

High pressure vapor is used to increase the temperature of potato juice from 45° C. to 105° C. for complete protein coagulation and concentration.

Theoretical calculation has been done using the following equations:

$$\dot{m}c_{p_{feed}}\int_{T_d}^{T_p}dT + \dot{m}_p\Delta H_p + \dot{m}c_{p_{conc}}\int_{T_p}^{T_f}dT + \dot{m}c_{p_{vapor}}\int_{T_p}^{T_f}dT \quad \text{[Equation 1]}$$

Where:
m = mass flow rate (kg/h);
$T_p$ = phase transition temperature (K);
$T_d$ and $T_f$ = are the inlet and outlet temperatures respectively (K);
$Cp_{feed}$ = specific heat capacity of first phase, below $T_p$ (kJ/kg K);
$Cp_{conc}$ = specific heat capacity of second phase, above $T_p$;
$Cp_{vapor}$ = specific heat capacity of second phase, above $T_p$;
$\Delta H_p$ = is the latent heat of the phase exchange (for evaporation 2260 kJ/kg).

From equation 1 the obtained value is in kJ/h, which is the unit for power. Multiply this value for 3600 seconds (1 hour) gives the energy, in kJ/s or kW.

Freeze Concentration

Being a phase change process as well, Equation 1 applies also here. The clarified potato juice was brought from 15° C. to −15° C. (ΔT). Thermal capacity of the ice ($cp_{ice}$) was applied and the $\Delta H_p$ of phase change for water, which happens at 0° C. at 1 bar pressure, is equal to 334 kJ/kg. The concentrated potato juice exiting the freeze concentration unit is assumed to have a final concentration 55% dry matter.

Theoretical calculations of energy consumption for freeze concentration, due to the ratio between the two enthalpies of vaporization and fusion of the water plus the fact that the temperature difference ($\Delta T$) is lower when the solution is cooled down, showed an energy reduction value of 88% respect to thermal treatment.

Specific energy consumption as derived from actual energy use of the equipment showed that freeze concentration can realize energy savings of 64%, relative to an industrial evaporation installation.

For freeze concentration technology, the component that involves the major energy consumption is the crystallizer (ice maker). Its efficiency depends not only on the difference in temperatures, but also in the residence time, which has to be not more than few seconds in order to keep the process energetically feasible. This is the reason why a pre-cooling system is highly recommended. As a probable solution for process integration, the produced ice can be used as costless cooling media, because it does not need any further purification procedure (ice purity ≥98%).

Example 6: Conversion of Glutamine and Asparagine into Glutamate and Aspartate

The amino acids asparagine and glutamine are generally considered flavorless, but can be converted into their umami-conferring counterparts aspartate and glutamate by commercial enzyme preparations.

Two such enzyme preparations were obtained; PreventAse from DSM and SD-C100S from Amano.

Enzyme optima for the conversion of glutamine were determined in artificial potato juice. Each enzyme was then applied at appropriate conditions in concentrated protein-depleted potato juice which was then analyzed for amino acid content.

Artificial PJ was prepared by dissolving citric acid (Merck 1.00244) at 6.3 g/L, KCl (Prolabo 26759.291) at 7.4 g/L and adjusting the pH with 1M-5M KOH to values of 3, 4, 5, 6 and 7. Glutamine (Applichem A3734) were dissolved at concentrations of 1.9 g/L or 3.2 g/L respectively, corresponding to typical levels in potato juice. To these samples the enzymes were added at levels of 0.1% (SD-C100S) or 0.4% (Preventase). This was followed by incubation at 24, 31, 42, 48 or 60 degrees C. for 30 minutes. Reactions were quenched by adding 0.10 volumes of 1M NaOH. 50 uL aliqouts of these samples were diluted in 2.5 mL final volume and introduced in the Berthelot assay. This method detects the ammonia that is released upon conversion of Gln or Asn into Glu or Asp. 100 uL of diluted sample was added to a microtiter plate. To each well was added: 20 uL of 10% phenol in ethanol; 20 uL of 5 g/L sodium nitroprusside; 50 uL of an oxidizing solution prepared from 1 part sodium hypochlorite solution and 4 parts of a solution containing 20% trisodium citrate and 1% NaOH. After allowing the reaction to proceed under ambient conditions, the formed color complex was quantified by measuring the absorbance at 640 nm. A calibration curve was constructed from ammonium carbonate at concentrations between 0 and 100 micromolar.

pH and temperature optima for both enzymes are displayed in contour graphs. A clear optimum exists for the Amano material in both pH and temperature. In contrast, the DSM enzyme is only mildly influenced by temperature but does respond strongly to pH.

Both enzymes were tested in deproteinated, concentrated potato juice for their ability to produce aspartate and glutamate.

150 mL of juice was treated with 4 mg/L of PreventAse (DSM) at ambient temperature (approximately 24° C.) at pH 6.0. Aliqouts were taken before enzyme introduction, after 1, 2, 24 and 48 hours of incubation. 1 liter of juice was treated with 1 mg/mL of Amano SD-C100S at pH 6.5 and 60° C. Aliquots were taken before enzyme introduction, after 1 hours, 3 hours and 24 hours of incubation. These samples were analyzed for free amino acids according to the methods described above.

SD-C100S produces only glutamate, while Preventase produces both aspartate (rapidly) and glutamate (more slowly).

TABLE 5

Conversion of Asparagine into aspartate and of glutamine into glutamate by PreventAse (4 g/L at pH 6.0 and ambient temperature). Amino acid expressed as g/kg of dry matter.

| Amino acid | 0 hours | 1 hour | 48 hours |
|---|---|---|---|
| Alanine | 4.25 | 4.26 | 4.38 |
| Arginine | 8.32 | 8.35 | 8.27 |
| Asparagine | 67.33 | 0.28 | N.D. |
| Aspartate | 14.11 | 79.77 | 80.1 |
| Cystine | N.D. | N.D. | N.D. |
| GABA | 17.31 | 17.33 | 17.19 |
| Glutamate | 5.15 | 5.25 | 7.69 |
| Glutamine | 25.75 | 25.34 | 20.26 |
| Glycine | 0.64 | 0.64 | 0.64 |
| Histidine | 1.92 | 1.92 | 1.89 |
| Isoleucine | 3.5 | 3.5 | 3.52 |
| Leucine | 4.04 | 4.06 | 4.09 |
| Lysine | 4.68 | 4.7 | 4.64 |
| Methionine | 2.32 | 2.36 | 2.32 |
| Phenylalanine | 3.95 | 3.97 | 3.93 |
| Proline | 5.48 | 5.48 | 5.53 |
| Serine | 6.52 | 6.53 | 6.53 |
| Threonine | 2.48 | 2.46 | 2.48 |
| Tyrosine | 5.18 | 5.18 | 5.2 |
| Total free amino acids | 182.93 | 181.38 | 178.66 |
| wt. % of dry matter | 18.2 | 18.1 | 17.9 |
| glu + gln + gaba | 48.21 | 47.92 | 45.14 |
| wt. % of free amino acids | 26 | 26 | 25 |
| asp + asn | 81.44 | 80.05 | 80.10 |
| wt. % of free amino acids | 45 | 44 | 45 |

TABLE 6

Formation of glutamate by Amano SD-C100S (1 mg/L at pH 6.5 and 60° C.)

| Time (h) | Glutamate | Aspartate |
|---|---|---|
| 0 | 9 | 14 |
| 1 | 31 | 14 |
| 3 | 32 | 14 |
| 24 | 37 | 15 |

Example 7: Conversion of RNA into 5'-Nucleotides

Among the nucleotides, only the five-prime purine nucleotides, 5'-AMP, 5'-GMP and 5'-IMP confer umami taste. These nucleotides are produced by the enzymatic degradation of nucleic acids by the proper enzymes. Under unfavorable conditions, endogenous enzymes can degrade nucleic acids into 3'-nucleotides which have no umami taste. Four different deproteinated potato juice concentrates were prepared and exposed to Amano RP-1G (RNase, Amano, Japan).

Concentrates were produced as follows, starting from flocculated potato juice that was prepared as described in example 1:

Concentrate A: Potato juice was deproteinated by ultrafiltration over 5 kDa membranes. The permeated was recovered and concentrated by reverse osmosis and further concentrated by evaporation.

Concentrate B: Potato juice was deproteinated by ultrafiltration over 5 kDa membranes. The permeated was recovered and concentrated by evaporation.

Concentrate C: Potato juice was deproteinated by binding the protein to a mixed-mode ion exchange resin. The protein-depleted juice was recovered and concentrated by reverse osmosis and further concentrated by evaporation.

Concentrate D: Potato juice was deproteinated by binding the protein to a mixed-mode ion exchange resin. The protein-depleted juice was recovered and concentrated by reverse osmosis and further concentrated by freeze crystallization.

50 mL aliquots of all juices were adjusted to pH 5.0 and incubated for 10 minutes at 95° C. to inactivate endogenous enzyme activity. 25 mL of each were kept as an unincubated control, while the other 25 mL were treated with 0.1 g/L of Amano RP-1G at 70° C. for one hour. These samples were frozen and sent out for external analysis. Levels of 5' nucleotides were determined by HPLC on a Shimadzu WAX-1 column with dual wave length detection at 260 and 280 nm. The most dominant 5'-nucleotide was 5'-IMP, reported in table 7. The sum of total five-prime purine nucleotides is reported as well.

TABLE 7

5'nucleotides before and after treatment with Amano RP-1G.

| Label | Treatment | % DM | mg 5'IMP/kg DM | mg 5'NMP/kg DM |
|---|---|---|---|---|
| A | as is | 45.17 | 505 | 704 |
| B | as is | 50.82 | 464 | 594 |
| C | as is | 48.7 | 957 | 1.462 |
| D | as is | 18.7 | 947 | 1.508 |
| A | 1 hr 70° C./RP-1G | 45.17 | 737 | 974 |
| B | 1 hr 70° C./RP-1G | 50.82 | 600 | 771 |
| C | 1 hr 70° C./RP-1G | 48.7 | 1.078 | 1.622 |
| D | 1 hr 70° C./RP-1G | 18.7 | 1.497 | 2.914 |

Concentrates that were Prepared Via Membrane Techniques showed relatively low levels of 5-prime nucleotides. Apparently, the RNA that these nucleotides originate from are unable to cross an ultrafiltration membrane. The FC method results in the highest amount of 5-prime nucleotides and also shows the highest increase in these nucleotides upon exposure to a nuclease. This demonstrates that cold-processing retains RNA in polymerized form.

Example 8: Hydrolytic and Oxidative Degradation of Lipids in Potato Juice as a Function of Temperature and Time The degree of breakdown of lipids was determined at different temperatures over the course of 45 minutes. Briefly, prechilled potatoes (4° C.) were grated and the juice was incubated at temperatures of 3° C., at ambient temperature of 22° C. or at a process temperature of 37° C. Since grating, handling and pumping of potato juice during processing at industrial scale results in waste heat, potato juice temperatures between 30 and 40° C. are routinely achieved.

After incubation at 15, 30 and 45 minutes, 5 mL aliquots of potato juice were pipetted directly into mixtures of 5 mL of chloroform (Merck1.02445) and 10.5 mL of methanol (Prolabo 20847.347) in order to quench any ongoing enzymatic reactions and to facilitate lipid extraction. This extraction was performed according to the method of Bligh & Dyer. The final extract was evaporated to dryness in vacuo in preweighed tubes and the quantity of lipid material thus recovered was determined by weighing on a Satorius analytical balance (Type 1712). The recovered lipid material was then redissolved in 5 mL of hexane (Alfa Aesar 33321) for further analysis.

The levels of phospholipids were determined according to the method of Rouser (Rouser, G., Fleischer, S. & Yamamoto, A. (1970) Lipids 5, 494-496) while the level of glycolipids were determined using the Orcinol method. Briefly, 100 uL aliquots of lipids extract were evaporated to dryness in glass tubes. 200 mg orcinol (SigmaAldrich 447420) was dissolved in 100 mL of 70% v:v sulphuric acid (Merck 1.00731). 2 mL of this solution were added to each glass tubes and incubated for 20 minutes at 800° C. After cooling to ambient temperature absorbances were read at 505 nm on a Multiskan Go (Thermo Scientific) and glycolipids levels were determined relative to a calibration curve prepared from glucose (Merck 8337.0250)

Hydroperoxides, which are the primary oxidation products of polyunsatured fatty acids, were estimated by the method of Shanta and Decker (Shanta, N. C and Decker, E. A, 1994, J. AOCS Int, 77, p 421-4 "Rapid, sensitive, iron-based spectrophotometric method for determination of peroxide value of food lipids"). Briefly, a ferric thiocyanate reagent solution was prepared by mixing 0.132 M $BaCl_2$ (Prolabo 21716.266) in 0.4M HCl with an equal volume of 0.144 M ferric sulphate heptahydrate (SigmaAldrich F7002). This solution was mixed with an equal volume of 3.94 M ammonium thiocyanate (Prolabo 21344.237). 100 uL of hexane-dissolved lipid material were mixed into 1.4 mL of methanol/n-butanol (Prolabo 20808.325) (1:1 v:v) followed by addition of 15 uL of the ferric thiocyanate reagent and thorough mixing. After 20 minutes, the absorbance at 510 nm was read and compared to that of a calibration curve prepared from cumene hydroperoxide (SigmaAldrich 247502), and expressed as absorbance units.

Secondary oxidation products were estimated by measuring the para-Anisidine value (pAV) according to the method of the American Oil Chemists Society (AOCS, 2004, Official method Cd. 18-90 in: Official methods and recommended practices of the American Oil Chemists Society). This method detects fatty aldehydes, in particular unsaturated ones. It is commonly accepted that lower pAV values are indicative of less degradation of fatty acids.

Briefly, to 1.7 mL of hexane-dissolved lipid extract 0.3 mL of 20 mM para-anisidine (SigmaAldrich A88255) were added. The absorbance at 350 nm was read after 10 minutes, relative to a hexane blank. The results of these analyses are reported in table 8.

TABLE 8

Hydrolytic and oxidative degradation of lipids in potato juice

| T ° C. | Time (minute) | Total lipids (g/L) | Glyco-lipids (mg/L) | Phospho-lipids (mg/L) | Hydro-peroxy-lipids (AU) | pAV |
|---|---|---|---|---|---|---|
| 3 | 0 | 2.47 | 276 | 443 | 0.775 | 2 |
| 3 | 15 | 2.53 | 238 | 412 | 0.822 | 3 |
| 3 | 30 | 2.24 | 242 | 381 | 0.834 | 8 |
| 3 | 45 | 2.40 | 242 | 368 | 0.855 | 9 |
| 22 | 15 | 2.60 | 253 | 390 | 0.827 | 7 |
| 22 | 30 | 2.39 | 264 | 393 | 0.842 | 20 |
| 22 | 45 | 2.17 | 228 | 344 | 0.859 | 24 |
| 37 | 15 | 2.58 | 223 | 349 | 0.832 | 23 |
| 37 | 30 | 2.56 | 78 | 62 | 0.868 | 58 |
| 37 | 45 | 2.66 | 54 | 53 | 0.892 | 65 |

As can be seen in table 8, intact glyco- and phospholipids are degraded over time, in particular at elevated temperatures. Primary oxidation products are present at somewhat higher levels at higher temperatures, but their levels are below the level of quantification in all cases. In contrast, secondary oxidation products as indicated by pAV values increase rapidly over time at higher temperatures.

Example 9: Taste Perceptions of Protein-Depleted Potato Concentrate/Extract and a Protein-Depleted Potato Concentrate/Extract that is Enriched in Aspartate The four basic tastes, salt, sweet, sour, and bitter could be boosted or enhanced with a protein-depleted potato extract. Also the fifth taste, umami, could be boosted with the potato extract. In addition, mechano-, pain-, and thermo-taste sensation can be enhanced. The exact effect of the potato extract depended on the matrix in which it is present, and what tastes are present in the matrix itself. A distinction between water- and fat-based was made, as well as a distinction between savory and sweet systems. Tasting was performed blind (one-sided) with a panel of either 5 or 10 persons.

As can be seen from table 9, where the potato extract was compared with a reference material that did not have the potato extract, there are many different combinations of sensations. Most of the sensations could be related to the initial composition of the reference material, such as spices, chili pepper, and celery being present and thus enhancement of spiciness was perceived. Whenever salt was present, especially without other spices or herbs, enhanced saltiness was perceived. Apart from such taste perceptions, also creamy mouthfeel, long-lasting taste sensation, and certain specific tastes were enhanced in the presence of potato extract, e.g. cheese, citrus fruit, meaty. In the case of alcoholic beverages, a stronger alcohol sensation could be perceived.

As can be seen from table 10, where the potato extract was compared with a potato extract enriched in aspartate, there are some trends in taste sensation. Potato extract+Asp enhanced sweetness more often than the potato extract alone, which may be related to aspartate contributing to umami taste, and umami flavor intensifies sweet and salt tastes. In the presence of 5'nucleotides umami taste may be enhanced even more. Also, the potato extract with aspartate enhances specific flavor more than the potato extract alone. A creamier mouthfeel was observed for the potato extract, and less for the potato extract with aspartate. Spiciness was more enhanced with the potato extract as is.

TABLE 9

Taste sensations (n = 5) of potato extract (x) for several applications, being either water- or fat-based, in a sweet- or savory system

| | General classification | | | |
|---|---|---|---|---|
| | Water based | Fat based | Sweet | Savory |
| Savory applications | | | | |
| Gazpacho | x | | | x |
| Meatballs | x | | | x |
| Pastasauce | x | | | x |
| Full-fat mayonaise | | x | | x |
| Low-fat mayonaise | x | | | x |
| Ketchup | x | | | x |
| Satésauce | x | | | x |
| Béchamel sauce | x | | | x |
| Cocktail sauce | x | | | x |
| Pesto génovese | | x | | x |
| Coating on potato patties | x | | | x |
| Cream cheese with shrimps | x | | | x |
| Vegetarian Butcher chicken pieces | x | | | x |
| Paprika spread (Zonnatura) | x | | | x |
| Cream cheese | x | | | x |
| Cream cheese chives | x | | | x |
| Cheese spread | x | | | x |
| Cheese tapasdip | x | | | x |
| Basil in oil | x | | | x |
| Butter with salt | | x | | x |
| Butter without salt | | x | | x |
| Oil with rosemary | | x | | x |
| Oil with basil | | x | | x |
| Thai oil | | x | | x |
| Sweet applications | | | | |
| Nutella | | x | x | |
| White chocolate spread | | x | x | |
| Optimel | x | | x | |
| Strawberry jam | x | | x | |

TABLE 9-continued

Taste sensations (n = 5) of potato extract (x) for several applications, being either water- or fat-based, in a sweet- or savory system

| | | |
|---|---|---|
| Raspberry juice | x | x |
| Applesauce (appelmoes) | x | x |
| Custard - vanilla | x | x |
| Custard - strawberry flavor | x | x |
| Custard - chocolate | x | x |
| Ice cream - vanilla | x | x |
| Ice cream - strawberry flavor | x | x |
| Vanilla sauce | x | x |

Liquors

| | | |
|---|---|---|
| Bailey's | x | x |
| Limoncello | x | x |
| Beer | x | |
| Red wine | x | |

Taste effects compared with reference (without product x)

| | Enhanced saltiness | Enhanced sweetness | Enhanced acidity | Enhanced bitterness | Enhanced spiciness | Creamier mouthfeel | Enhanced juiciness | Enhanced taste sensation | Long-lasting taste sensation |
|---|---|---|---|---|---|---|---|---|---|
| Savory applications | | | | | | | | | |
| Gazpacho | x | | | | x | | | | x |
| Meatballs | | | | | | | x | x (meaty) | x |
| Pastasauce | x | | x | | x | | | | |
| Full-fat mayonnaise | | x | x | | | x | | | Tingly mouthfeel |
| Low-fat mayonnaise | | | x | | | | | x (citrus fruit) | |
| Ketchup | | x | x | | x | | | | Tingly mouthfeel |
| Saté sauce | x | | | | x | x | | x (coconut) | |
| Béchamel sauce | | | x | | | x | | x (all tastes) | |
| Cocktail sauce | | | x | | | | | | |
| Pesto génovese | x | | | | | | | x (cheesy) | |
| Coating on potato patties | x | | | | | | | x | |
| Cream cheese with shrimps | x | x | | | | x | | | |
| Vegetarian Butcher chicken pieces | x | x | x | | | | | | Tingly mouthfeel |
| Paprika spread Zonnatura | | | | x | | | | | |
| Cream cheese | | | | | | x | | x (full flavor) | |
| Cream cheese chives | | | | | | x | | x (fresh) | |
| cheese spread | x | | | | | | | x (cheesy) | |
| Cheese tapasdip | | | | | x | | | x (chili) | Burns on tongue at high dosage |
| Basil in oil | | | x | | | | | x | Tingly mouthfeel |
| Butter with salt | x | | x | | | | | | |
| Butter without salt | | | | | | | | | |
| Oil with rosemary | | | | | | | | x | x |
| Oil with basil | | | | x | | | | x | |
| Thai oil | | | | | | | | x | |
| Sweet applications | | | | | | | | | |
| Nutella | | x | | | | x | | | x |
| White chocolate spread | | x | | | | x | | x (white chocolate) | x |
| Optimel | | | x | | | x | | | |
| Strawberry jam | | x | x | | | | | | |
| Raspberry juice | | | x | | | | | x (fruit in general) | |
| Applesauce (appelmoes) | | | | | | | | | |
| Custard - vanilla | | | | | | x | | | |
| Custard - strawberry flavor | | | | | | x | | | |
| Custard- chocolate | | | | | | x | | | |
| Ice cream - vanilla | | | | | | x | | | |
| Ice cream - strawberry flavor | | | | | | x | | x (strawberry) | |
| Vanilla sauce | | | | x | | | | | |

TABLE 9-continued

Taste sensations (n = 5) of potato extract (x) for several applications, being either water- or fat-based, in a sweet- or savory system Liquors

| | | | |
|---|---|---|---|
| Bailey's | | | x (alcohol) |
| Limoncello | x | | x (lemon and alcohol) |
| Beer | | x | |
| Red wine | | x (tannins) | x |

TABLE 10 taste sensations (n = 10) for potato extract (x) vs potato extract enriched in aspartate (o). More symbols of one of the extracts shows a stronger effect

| | Enhanced | | | | Enhanced specific taste | Lingering taste sensation | Full/ round flavor | Mechano, pain, thermal | | | |
|---|---|---|---|---|---|---|---|---|---|---|---|
| | Saltiness | Sweetness | Umami | Acidity | Bitterness | | | | Spiciness | Creamy mouthfeel | Tickling on tongue | Astringency |
| Onion soup | o | x/oo | o | xx/o | x | x/oo | x/oo | x | x | o | | o |
| Gazpacho | | x | | x/o | x/oo | x/oo | x/oo | o | x | | | x |
| Basil pesto | x/o | o | x/o | o | x/o | o | o | x | o | | o | o |
| Low fat mayonnaise | x | o | | x/o | | x/oo | | o | o | xx/o | | x |
| Ketchup | o | xx/o | | x | | x | | o | xx/o | xx/o | o | |

Example 10: Functionalities of Cold-Processed Potato Protein

Processing

Fresh potato juice (PJ) was cooled to 18° C. with a heat exchanger and subjected to a pre-treatment by flocculation and subsequent sedimentation. The remaining juice is called clarified potato juice (CPJ) and was polished on a separator as described above. The CPJ had an absorbance <0.3 at 620 nm and a lipid content of 12 g/kg dry matter.

A freeze-concentrated total potato concentrate (FC TPoC) was prepared by concentrating the CPJ to about 30 wt % dry matter by freeze-concentration technology by the method described in example 1.

A freeze-concentrated total protein concentrate (FC TPC) was prepared by concentrating the CPJ on an ultrafiltration (UF) system fitted with a spiral wound Koch membrane with a 5 kDa membrane cut-off. The retentate of UF was concentrated to about 30 wt % DM with freeze concentration technology (EFC separations) as described in example 1.

A freeze-concentrated dia-filtrated total protein concentrate (FC dTPC) was prepared by dia-filtrating the CPJ against demineralized water on a UF system fitted with a spiral wound Koch membrane with a 5 kDa membrane cut-off.

The FC TPoC, FC TPC, and the FC dTPC were then dried by freeze-drying (Sublimator 2×3×3, Zirbus Technology BV, process parameters: low vacuum (deep vacuum of 0.05 mbar), deep freezing (−55° C.).

Two total protein isolates (TPI's) that were produced without cold processing and with chromatography as described in patent WO 2008069650 A1, named TPI 1 and TPI 2, and a heat-coagulated total protein isolate (HC PI, available at Avebe, The Netherlands) were included for comparison. The TPIs were dried by spray-drying, the HC PI was dried by flash-drying.

Composition

The obtained FC concentrates contain all of the potato proteins but depending on the process, differences in total protein content, which makes them total potato concentrates (TPoC) or total protein concentrates (TPC or dTPC). The compositions of the dried concentrates, as well as those of the TPIs and the HC PI, can be found in Table 11.

Functionality

Several protein functionalities were tested, such as solubility, emulsifying capacity, and gel strength.

Solubility

Solubility was determined by preparing 50 mL of 5 wt % protein dispersions (A). Then 10 mL is transferred into a new tube (B). The tube (B) is centrifuged (Heraeus Mulitfuge 1S-R, Thermo Electron Company) at 800 g for 10 min and the supernatant is decanted into a new tube (C). The dry matter content of the supernatant in tube C and of the protein dispersion in tube A were determined on a halogen moisture balance (HR83, Mettler Toledo) set at 150° C. for 15 min. The solubility is then expressed as DM % in C divided by the DM % in A times 100%.

Emulsifying Capacity

Emulsifying capacity was determined by preparing 50 mL of a 2 wt % protein dispersion, with 0.5 g NaCl. The pH of the protein dispersion was adjusted to 4.5 with HCl. About 100 g of sunflower oil (Butella) was added and a pre-emulsion was prepared with an Ultraturrax (IKA T18 digital) at 10.000 rpm for 30 sec. The pre-emulsion was transferred to a pre-tared Hobart bowl (N50), weighed, and then beaten at the max speed (3) while sunflower oil was constantly fed to the bowl with a pump (Easy-load Masterflex, Cole Parmer Instrument Company) at 25 rpm. As soon as the emulsion broke, the pump was stopped and the weight of the emulsion was measured. The emulsifying capacity is calculated as the amount of oil in g per g of powder.

Gel Strength

Gel strength was determined by measuring the max force (N) on a protein gel. The gel was prepared by preparing 8 wt % protein dispersions in demineralized water. The pH was adjusted to 3.0 or 7.0 with HCl or NaOH, and the conductivity was set to 11 mS/cm or 14 mS/cm, unless conductivity of the initial protein solution was much higher. The protein dispersions were heated in a waterbath at 95° C. for 45 min, after which the dispersions were left to cool down overnight in the refrigerator. The day after, gel strength was determined on a Texture Analyzer (Stable Microsystems) fitted with a 5 kg load cell and a 10 mm cylindrical probe. The force on compression was measured over a distance of 8 mm, pre-test speed 1.5 mm/s, and test speed was 1.5 mm/s.

TABLE 11

Composition and physicochemical properties of a freeze-concentrated (FC) total potato concentrate (FC TPoC), one freeze-concentrated total protein concentrates (FC TPC) and a freeze-concentrated and dia-filtrated total protein concentrate (FC dTPC), compared with heat-coagulated protein isolate (HC PI) and two total protein isolates (TPI 1 and 2).

|  | DM content (% w/w) | Protein content (% on DM basis) | Solubility at 5 wt % (%) | Conductivity at 10 wt % (mS/cm) |
|---|---|---|---|---|
| FC TPoC | 92.1 | 30.0 | 97 | 33.0 |
| FC TPC | 86.8 | 47.7 | 100 | 17.0 |
| FC dTPC | 95.7 | 72.9 | 80 | 2.4 |
| HC PI | 94.0 | 91.0 | 1 | 3.7 |
| TPI 1 | 86.0 | 85.8 | 60 | 6.5 |
| TPI 2 | 86.6 | 85.2 | 56 | 5.2 |

The freeze-concentrated samples had lower protein contents than the HC PI and both TPIs, but all freeze-concentrated samples had a much higher solubility than the HC PI and TPIs. Solubility is a very important property for the functionality of the product. The conductivity of the freeze-concentrated samples, except for the dia-filtrated version, were much higher than those of the HOPI and TPIs at a powder concentration of 10 wt %. The conductivity is an indication of minerals that are present in the sample, thus indicating that the FC samples still contain a lot of minerals that are naturally present in the potato as no buffers, salts, or other solvents were added during processing. The TPIs were produced by chromatographic processes in which elution buffers were used and the proteins were absorbed from a potato juice stream. Therefore, the conductivity in the TPIs is much lower and the natural mineral balance of the potato has been disturbed. The mineral balance has a big influence on the final functionality of potato proteins.

Figure 6:
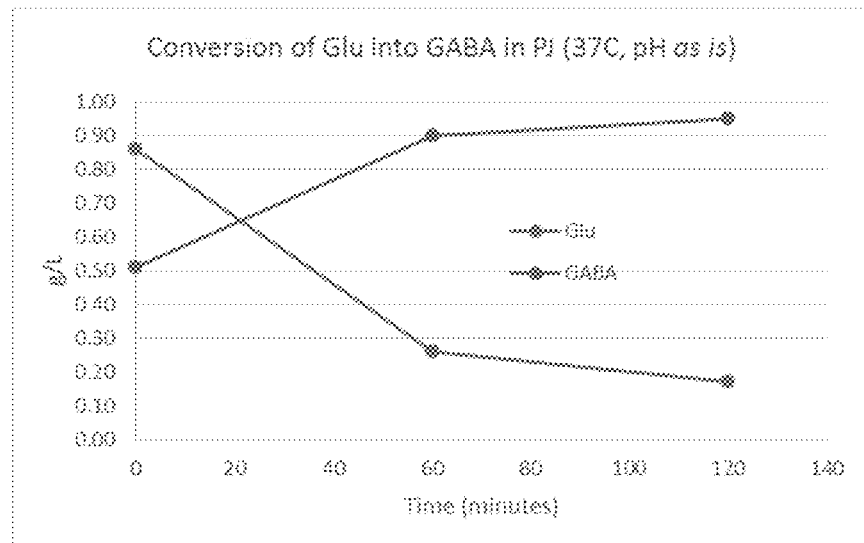
FIG. 6: conversion of glu into GABA

FIG. 6 shows the emulsifying capacities (EC) of the freeze-concentrated materials versus those of the HC PI and the TPIs. Overall, the freeze-concentrated materials had a higher EC than HC PI, which could not stabilize an emulsion at all, and a higher EC than the TPIs.

Figure 7:
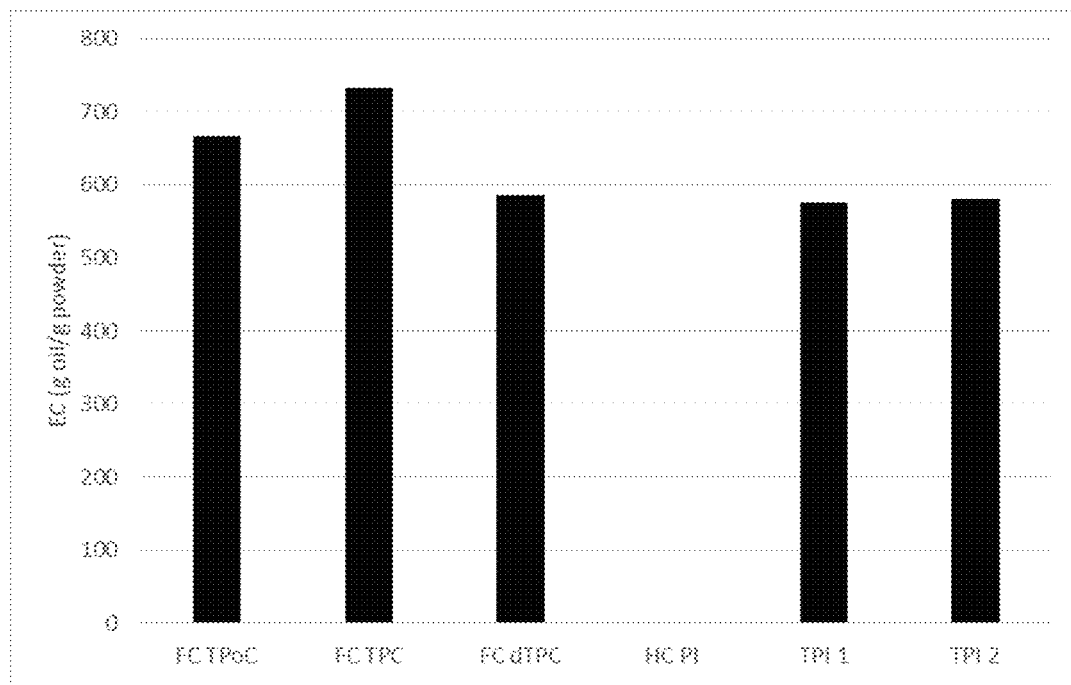
FIG. 7: the emulsifying capacities (EC) of the freeze-concentrated materials versus those of the HC PI and the TPIs. Overall, the freeze-concentrated materials had a higher EC than HC PI, which could not stabilize an emulsion at all, and a higher EC than the TPIs.

FIG. 7 shows the emulsifying capacity (EC) of freeze-concentrated potato and protein concentrates compared with total protein isolates at pH 3.

Figure 8:
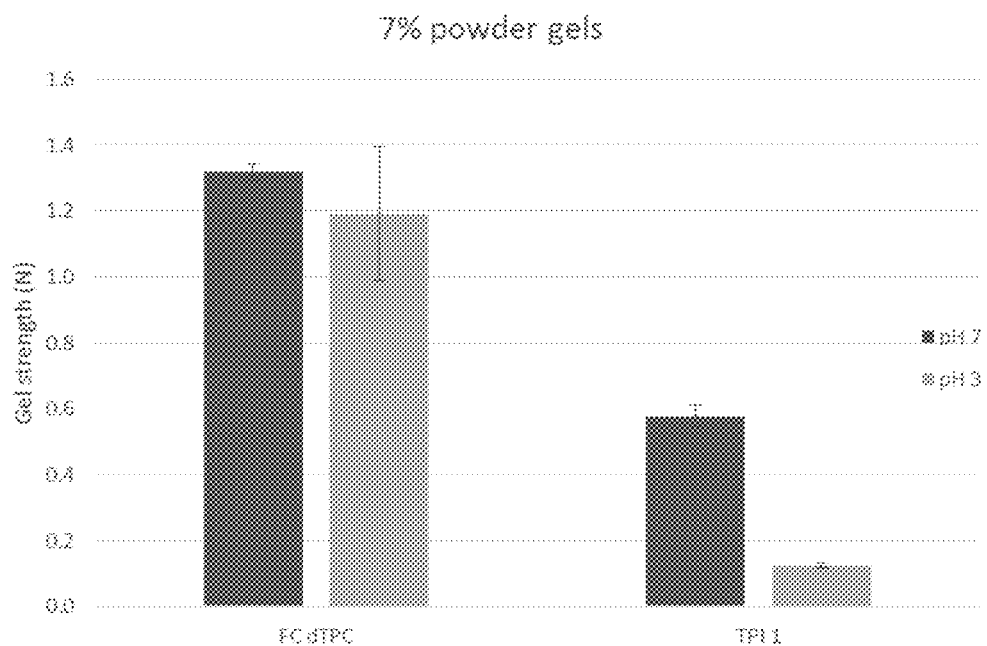
FIG. 8: Emulsifying capacity (EC) of freeze-concentrated potato and protein concentrates compared with total protein isolates at pH 3.
Figure 9:
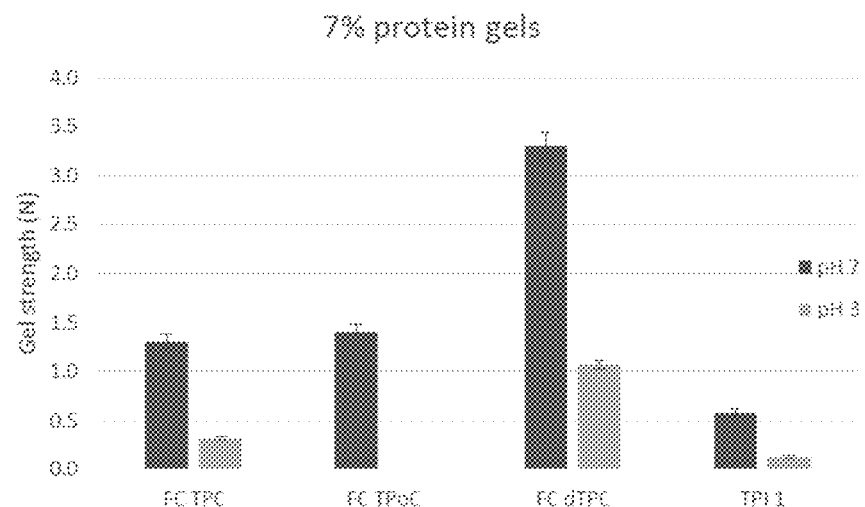
FIG. 9: Gel strength of freeze-concentrated TPC, TPoC, dTPC compared with TPI 1 at pH 7.0 and pH 3 at a protein concentration of 7 wt %.
Figure 10:
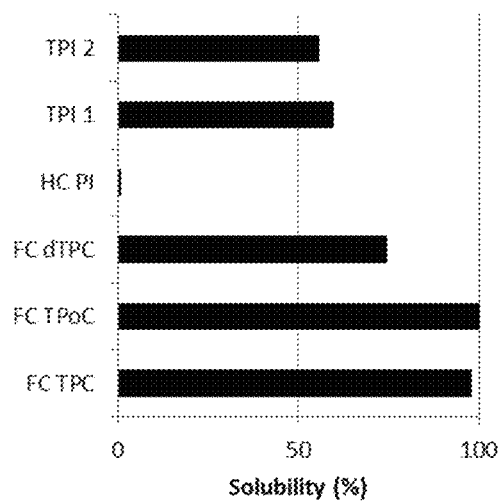
FIG. 10: Solubility of freeze concentrated protein samples in comparison to protein samples TP1 and TP2.

At similar dry matter content, the gel strength of the freeze-concentrated dTPC was much higher than that of TPI 1 at pH 7 and pH 3 (FIG. 8). HC PI did not form a gel at any concentration and pH.

At similar protein weight in the gel, the gel strength of the freeze-concentrated dTPC, TPoC, and TPC was higher than that of a TPI at pH 7 (and HC PI, which is not shown in the figures). At pH 3, the gel strength of FC TPoC is zero and thus lower than that of TPI 1, but the gel strength of FC TPC and FC dTPC are higher than that of TPI 1 (and HC PI). These properties are interesting for a wide range of food products.

Example 12

Protein samples were prepared by various pre-treatments in line with Example 1. The protein samples included a non-pre-treated sample, as well as samples prepared by microfiltration, low-speed centrifugation, and flocculation. The carbonyl content, which reflects the amount of protein degradation, was determined essentially according to the method of Levine et al. (Levine R L., Garland D., Oliver C. N., Amici A., Climent I., Lenz A. G., Ahn B. W., Shaltiel S., & Stadtman E. R. (1990) Methods Enzymol.; 186:464-78. "Determination of carbonyl content in oxidatively modified proteins.")

For each sample an aliquots containing 4-8 mg of protein material was diluted in 1.8 mL of 1-propanol (A19902, Alfa Aesar) to solubilize residual lipids and precipitate the protein. The samples were sonicated for 5 minutes in an ultrasoundbath and spun down at 14.000 rpm in an Eppendorf centrifuge for 5 minutes. The precipitate was washed twice more with 1.8 mL of 1-propanol and dissolved in 500 uL of 2M HCl containing 10 mM of 2,4-dinitrophenylhydrazine (DNPH, 04732, Sigma Aldrich). The resulting material was incubated in the dark for 1 hour, thoroughly mixing every 10 minutes. 500 uL of 20% trichloroacetic acid (T9159, Sigma Aldrich) were added to each tube, followed by a 10 minute incubation on ice to precipitate protein. The proteins were recovered by centrifugation, and washed twice with 1 mL of a 1:1 mixture of ethanol (ProLabo 83804.360) and ethylacetate (109623, Sigma Aldrich) to remove unbound reagent. Protein pellets were dissolved by a 1-hour incubation in 6 M Guanidine/HCl (0287, VWR) at 37 C while thoroughly mixing every 10 minutes. The resulting solution was cleared from undissolved material by centrifugation and the absorbances were read at 370 nm relative to the 6M Guanidine/HCl solution. Carbonyl contents were calculated from the absorbance using a molar extinction coefficient of 22000 L mol$^{-1}$ cm$^{-1}$. To account for protein loss in the precipitation steps, final protein concentrations were determined in the guanidine solutions via Sprint analysis (Sprint Rapid Protein Analyzer, CEM). The results are displayed in table 12.

TABLE 12 influence of pretreatment type on protein degradation.

| Pretreatment type | Carbonyl groups (mmol/kg soluble protein) |
|---|---|
| Without pretreatment (PJ as is) | 5.90 |
| microfiltration | 4.59 |
| Low speed centrifugation | 4.22 |
| Flocculation | 3.48 |

From these results it is clear that flocculation results in the least protein degradation, and therefore, in the highest quality product when isolated with freeze concentration.

Example 13: Composition and Functionality of Native Potato Protein Products (Comparative)

Several native potato protein products are known in the prior art. In order to evaluate whether the present method results in chemically distinct protein products, known procedure to obtain native potato protein products were followed and the resulting products compared to the product obtained using the present method.

Comparative Product 1:
Native Potato Protein Prepared According to WO 97/42834

200 grams of $CaCl_2*2H_2O$ were added to 200 liters of fresh industrial starch potato juice (Avebe, Gasselternijveen) containing 200 mg/L of sodium bisulfite. The mixture was stirred for 5 minutes, after which 360 grams of Na₂HPO4*2 H₂O were added, followed by an additional 5 minutes of stirring. pH was adjusted to 7.5 using 20% NaOH solution and the mixture was passed over a separator at 100 L/h to separate the precipitate from the supernatant. The precipitate was discarded and the supernatant was concentrated on an ultrafiltration unit equipped with a Koch 5 kDa membrane to a final volume of 15 liters. This concentrate was diafiltrated with 45 liters of demineralized water containing 9 grams of sodium bisulfite to a final volume of, again, 15 liters. 4 liters were stored frozen, while 11 liters were spray dried using an inlet temperature of 175° C. and an outlet temperature of 75° C., resulting in an off-white powder. The free amino acid content of this material was 12.8 g/kg DM.

Comparative Product 2:

Native Potato Protein According to US 2010/0087628

The procedure was modified slightly: native potato protein of low-to-neutral pH was produced by addition of 200 mg/L sulphite in a sedimentation tank, and then adjusted to the high pH conditions that are used in the procedure of US 2010/0087628. Since US 2010/0087628 does not report a concentration- or drying-step, the same concentration- and drying conditions as used for the other proteins in this example were used. Such steps are necessary since the protein concentration in the eluate is too low to allow for protein functionality experiments.

EBA chromatography was performed by adjusting industrial potato juice to pH 4.8 and introducing 7 bed volumes into a column loaded with a ligand-modified agarose-tungsten-carbide CS174 EBA resin (Upfront Chromatography, Denmark) in upflow orientation. The bed was washed with 20 mM citrate buffer, pH 4.8 and the protein was recovered by elution using a sodium hydroxide solution at pH 11. The protein eluate was concentrated by ultrafiltration on a 5 kDa ultrafiltration unit and spray dried to stabilize it until it could be further processed. This material was redissolved in demineralized water at 10% concentration and adjusted to pH 11 in order to match the NaOH eluate of US 2010/0087628. This material was again spray dried as above. The free amino acid content of this material was 2.4 g/kg DM.

Comparative Product 3:

Native Potato Protein Via EBA Chromatography According to EP 1 920 662

Two commercial grade native potato protein isolates were produced according to EP 1 920 662; S200 and S300. Briefly, EBA chromatography was performed by adjusting industrial potato juice to pH 4.8 and introducing 7 bed volumes into a column loaded with a ligand-modified agarose-tungsten-carbide CS174 EBA resin (Upfront Chromatography, Denmark) in upflow orientation. The bed was washed with 20 mM citrate buffer, pH 4.8 and the protein was recovered by elution with a formic acid buffer at pH 3 (S200) and with a carbonate buffer at pH 6.0 (S300). The protein eluate was concentrated by ultrafiltration on a 5 kDa ultrafiltration unit and spray dried at 175° C. inlet temperature and 75° C. outlet temperature. The free amino acid content of S200 was 3.2 g/kg DM, and the free amino acid content of S300 was 0.6 g/kg DM.

Results

Carbonyl content and amine content were determined for all comparative products as described above. The results are indicated in table 13:

TABLE 13 amine content and carbonyl content of comparative products 1-3:

| product | amine content [mmol amine/kg DM] | carbonyl content [mmol/kg soluble protein] | Total color |
|---|---|---|---|
| WO 97142834 | 701 | 18.7 | 1.61 |
| US2010/087628 | 620 | 16.3 | 0.98 |
| S200 | 596 | 13.3 | 1.53 |
| S300 | 657 | 6.6 | 0.12 |

Example 14

The functionality of the TPoC and TPC protein products described in Example 10 was compared to the functionality of known protein products, prepared as outlined in Example 13. Functional characteristics solubility and emulsifying capacity are an indicator for the degree to which the potato protein has been degraded during the isolation process. Solubility and emulsifying capacity were determined for all samples using the following standardized protocols.

Solubility

Protein products were introduced in demineralized water at 1.0% powder and stirred until dissolved, while taking a visual assessment of the dissolution behavior. When fully dispersed or dissolved, the pH was adjusted to 6.0. The resulting liquids were centrifuged for 5 minutes at 800 g. The supernatants were diluted 10 times in 100 mM NaOH solution and the protein concentration was determined by measuring the difference in absorbance between 280 and 310 nm. Solubility was expressed as the percentage of signal in the centrifuged samples relative to untreated controls.

Emulsifying Capacity 60 gram of 2% protein solutions were made by dissolving protein powder with a top stirrer. The pH was adjusted to pH 6 with 1M HCl. Pre-emulsions were made by mixing the protein solutions with 120 gram of sunflower oil with an Ultaturrax for 30 seconds at 10000 RPM. 150 gram of pre-emulsion was transferred to a Hobart mixer and while mixing at the highest rate, oil was slowly added to the emulsion at a constant rate of 25. Oil addition was stopped when the emulsion lost its viscosity. The Emulsifying Capacity (EC) is expressed as the total amount of oil that was added divided by the amount of protein present in the transferred pre-emulsion.

Results

The protein samples that were produces showed clear differences in dissolution behavior, solubility and emulsifying capacity. In addition, different production methods yielded products with distinct differences in smell.

TABLE 14

Properties of native potato protein that are produced via different processing routes.

| Sample | Process | Solubility at pH 6.0 (%) | Dissolution behaviour | Smell | Emuls. Cap |
|---|---|---|---|---|---|
| FC: TPoC | FC | 94.8 | Rapid | Mild "French-fries" | 901 |

TABLE 14-continued

Properties of native potato protein that are produced via different processing routes.

| Sample | Process | Solubility at pH 6.0 (%) | Dissolution behaviour | Smell | Emuls. Cap |
|---|---|---|---|---|---|
| FC: TPC | FC | 85.3 | Rapid | Neutral | 854 |
| US2010/087628 | EBA | 59.8 | Slow, partly keratinised, requires turrax | Neutral | 523 |
| WO97/42834 | UF | 27.7 | Slow | Animal, amine, potato | 756 |
| S200 | EBA | 84.4 | Slow | Bitter, potato | 602 |
| S300 | EBA | 75.7 | Somewhat slow | Neutral, hint of burning | 961 |

EBA: Expanding Bed Chromatography; UF: Ultrafiltration; FC: Freeze Concentration. TPoC: Total Potato Concentrate; TPC: Total Protein Concentrate; Emuls.Cap: Emulsifying capacity expressed as gram oil bound per gram protein.

Example 15

A series of enzymatic conversions and treatment steps on the product obtained according to the present invention was performed and the resulting materials were offered to a 10-person test panel for evaluation of basic tastes and "liking".

Sample Preparation

A flocculated and freeze-concentrated potato protein product was prepared according to example 1. Approximately 2 liters of potato juice concentrate were pooled to form a single batch of 42.6 Bx at pH 6.04. This batch was thoroughly stirred and split into 2 aliquots for Glutaminase treatment using 1.0 g/L of SD-C100S (Amano, UK). One batch was kept at ambient temperature (20-25° C.) and one was incubated at 60° C. with Glutaminase. Samples were recovered after 24 hours and allowed to cool to ambient temperature.

These samples were then split into two aliquots each, one of which was kept as an unincubated control while the other was incubated at ambient temperature for 24 hours with 1.0 mL of Asparaginase (PreventAse L, DSM, NL). All samples were tasted at 4 wt. % concentration. The extent of conversion was checked by amino acid analysis as described in under "Determination of amino acid content". Conversion was complete for asparaginase treatment, and near-complete for glutaminase treatment (in excess of 98%).

Taste Tests

A panel (n=10) of employee volunteers were formed to perform semi-trained taste research. Training involved previous tasting of basis tastes at different concentrations, to familiarize members with the tastes and to get some indication of the tasting capabilities of the individuals, including taste thresholds for individual tastes. Panel members were instructed and trained in methods for scoring of taste and taste intensity. The study was finished by all 10 panellists.

A structured protocol was developed in EyeQuestion for the sensory profiling of the taste-items (EyeQuestion software, version 3.15.1. Samples were provided as blinded tests, with random sample for each individual panellist. The sample order was different for each panellist, to avoid 'carry over' of taste from a previous sample in the mean end-results for the total panel.

Online forms were provided to grade all samples; automated in the dedicated software (EyeQuestion). Taste was scored in EyeQuestion on a VAS—a visual analogue scale—on which taste is scored on a continuous scale of 0-100, where 0 is no taste, 100 is the maximum taste. Samples were scored on the basic taste attributes sweet, salty, sour, bitter and umami. In addition, "liking" the taste was scored on a −30 to +30 scale, with negative scored indicating a "dislike" while positive scored indicate "liking".

Results

TABLE 15

| Glutaminase treatment | Asparaginase treatment | sour | sweet | salt | umami | Bitter | Taste liking |
|---|---|---|---|---|---|---|---|
| Glutaminase | Asparaginase | 12.3 | 20.0 | 11.5 | 38.4 | 7.8 | 4.5 |
| Glutaminase | Untreated | 5.1 | 22.3 | 8.2 | 32.6 | 6.0 | 1.0 |
| Untreated | Asparaginase | 8.9 | 20.2 | 6.2 | 25.3 | 6.5 | 3.0 |
| Untreated | Untreated | 3.1 | 26.6 | 6.5 | 18.9 | 8.9 | 0.5 |

Enzymatic treatment changed the taste impression of the potato amino acid concentrates in several ways. While bitterness was not significantly affected, glutaminase treatment increased the umami taste of the material. Saltiness was similarly increased but to a lesser degree. This increase is modest compared to the amount of salts already present in the samples.

Asparagine treatment increased the perception of sourness and reduced the perception of sweetness, and also increased umami taste, although to a lesser degree then glutamines treatment. Nevertheless, Asparaginase-treatment increased "liking" of the material to a much stronger extent than Glutaminase-treatment.

The invention claimed is:

1. A method for treating root- or tuber juice, comprising
   a) a pretreatment of the root- or tuber juice to remove root- or tuber lipids to a level below 28 g/kg dry weight;
   b) cooling the root- or tuber juice to a temperature of −0.3° C. to −16° C. to form ice crystals; and
   c) separating the ice crystals from the root- or tuber juice to obtain, as a first root- or tuber juice product, a concentrated root- or tuber juice containing native root- or tuber protein,
   wherein the pretreatment does not substantially affect the native state of protein in the root or tuber juice, and wherein said root- or tuber juice has an upper limit of dry matter content of 25 wt. %.

2. A method according to claim 1, wherein the pretreatment comprises flocculation, sedimentation, flotation, centrifugation or micro filtration.

3. A method according to claim 1, wherein the ice crystals are separated from the root- or tuber juice by filtration, hydraulic washing, piston washing, or centrifugation.

4. A method according to claim 1, wherein the concentrated root-or tuber juice comprises at least 30 wt. % protein, based on dry matter.

5. A method according to claim 1, whereby the concentrated root-or tuber juice is subsequently diafiltered to obtain a concentrated root- or tuber juice comprising at least 50 wt. % protein, based on dry matter.

6. A method according to claim 1, wherein the concentrated root-or tuber juice is subjected to coagulation, adsorption, filtration, chromatography, foam extraction, or low temperature isolation to obtain at least one fraction of a root-or tuber protein isolate and, as a second root- or tuber juice product, a protein depleted root- or tuber juice comprising free amino acids.

7. A method according to claim 6, wherein the root- or tuber protein isolate is a native root- or tuber protein isolate.

8. A method according to claim 6, wherein the protein-depleted root- or tuber juice is subjected to an enzymatic treatment to convert free amino acids asparagine from said protein depleted root- or tuber juice to aspartate, and/or the free amino acid glutamine to glutamate and/or optionally to gamma-amino butyric acid.

9. A method according to claim 6, comprising drying the protein-depleted root- or tuber juice to obtain a root- or tuber amino acid powder comprising free amino acids, which powder is a taste ingredient and/or enhancer.

10. A method according to claim 9, whereby the root- or tuber amino acid powder confers umami or kokumi taste.

11. A method according to claim 1, further comprising cooling the root- or tuber juice to a temperature of +5 to $-10°$ C. to form crystals, and subsequent isolation of the asparagine crystals.

12. A method according to claim 1, further comprising a step of reducing the content of triglycoalkaloids of said concentrated root- or tuber juice to below 800 mg/kg dry matter.

13. A method according to claim 5, whereby the concentrated root- or tuber juice is subsequently diafiltered to obtain a concentrated root- or tuber juice comprising at least 60 wt. % protein, based on dry matter.

14. A method according to claim 12, further comprising a step of reducing the content of triglycoalkaloids of said concentrated root- or tuber juice to below 320 mg/kg dry matter.

15. The method according to claim 1 wherein said concentrated root- or tuber juice has a carbonyl content of less than 4.7 mmol/kg soluble protein.

* * * * *